(12) United States Patent
Davis

(10) Patent No.: US 11,504,595 B2
(45) Date of Patent: Nov. 22, 2022

(54) DRY SWIM SIMULATION SYSTEM

(71) Applicant: James Davis, Pelham, NY (US)

(72) Inventor: James Davis, Pelham, NY (US)

( * ) Notice: Subject to any disclaimer, the term of this patent is extended or adjusted under 35 U.S.C. 154(b) by 194 days.

(21) Appl. No.: 16/905,393

(22) Filed: Jun. 18, 2020

(65) Prior Publication Data

US 2021/0154549 A1 May 27, 2021

Related U.S. Application Data

(60) Provisional application No. 62/941,098, filed on Nov. 27, 2019.

(51) Int. Cl.
*A63B 69/10* (2006.01)
*G09B 9/00* (2006.01)

(52) U.S. Cl.
CPC ............... *A63B 69/10* (2013.01); *G09B 9/00* (2013.01); *A63B 2210/50* (2013.01); *A63B 2220/05* (2013.01); *A63B 2225/15* (2013.01); *A63B 2225/20* (2013.01)

(58) Field of Classification Search
CPC . A63B 69/10; A63B 2210/50; A63B 2220/05; A63B 2225/15; A63B 2225/20; A63B 2024/0068; A63B 2071/025; A63B 2220/10; A63B 24/0006; A63B 71/0036; A63B 2071/0625; A63B 2071/0638; A63B 2071/0655; A63B 2071/0666; A63B 2214/00; A63B 2220/16; A63B 2220/20; A63B 2220/30; A63B 2220/40; A63B 2220/54; A63B 2220/62; A63B 2220/806; A63B 2220/807; A63B 2220/808; A63B 2220/836; A63B 2225/093;

(Continued)

(56) References Cited

U.S. PATENT DOCUMENTS 4,674,740 A * 6/1987 Iams .................... A63B 69/10
482/901
5,158,513 A * 10/1992 Reeves ................. A63B 69/10
434/254

(Continued)

OTHER PUBLICATIONS https://www.amazon.com/EARTHLITE-Travelmate-Massage-Support-Package/dp/B004GG62TM/ref=sr_1_2?crid=2S756Z33UT2JR&keywords=earthlite%2Bmassage%2Bkit%2Btravelmate&qid=1645475364&sprefix=earthlite%2Bmassage%2Bkit%2Btravelmate%2Caps%2C97&sr=8-2&th=1 (Year: 2010).*

*Primary Examiner* — Jeffrey S Vanderveen
(74) *Attorney, Agent, or Firm* — Gearhart Law LLC

(57) ABSTRACT

A dry swim simulation system is described. A portion of the system includes a platform extending vertically from the base platform and a first and a second retractable pulley. Another portion of the system includes a first support assembly comprising a first movable cradle configured to receive thighs of the user and a second support assembly. The second support assembly includes a second movable cradle configured to receive a torso of the user, a computing device, and a headrest comprising an opening configured to receive a face of the user such that the user views the computing device. The computing device is configured to receive parameters associated with the user during use of the dry swim simulation system from numerous electrical and/or mechanical components. The computing device is configured to analyze the parameters and provide real-time feedback to the user to improve performance of swimming strokes.

17 Claims, 13 Drawing Sheets

(58) Field of Classification Search
CPC ............ A63B 2225/50; A63B 2230/00; A63B 24/0062; G09B 9/00; G09B 5/02; G09B 19/0038
See application file for complete search history.

(56) References Cited

U.S. PATENT DOCUMENTS

| | | | | |
|---|---|---|---|---|
| 8,282,481 B2* | 10/2012 | Yun | ............... | G09B 19/0038 463/32 |
| 2005/0159275 A1* | 7/2005 | Bullman | ............ | A63B 69/0035 482/111 |
| 2008/0182723 A1* | 7/2008 | Aaron | ................ | A63B 24/0062 482/8 |

* cited by examiner

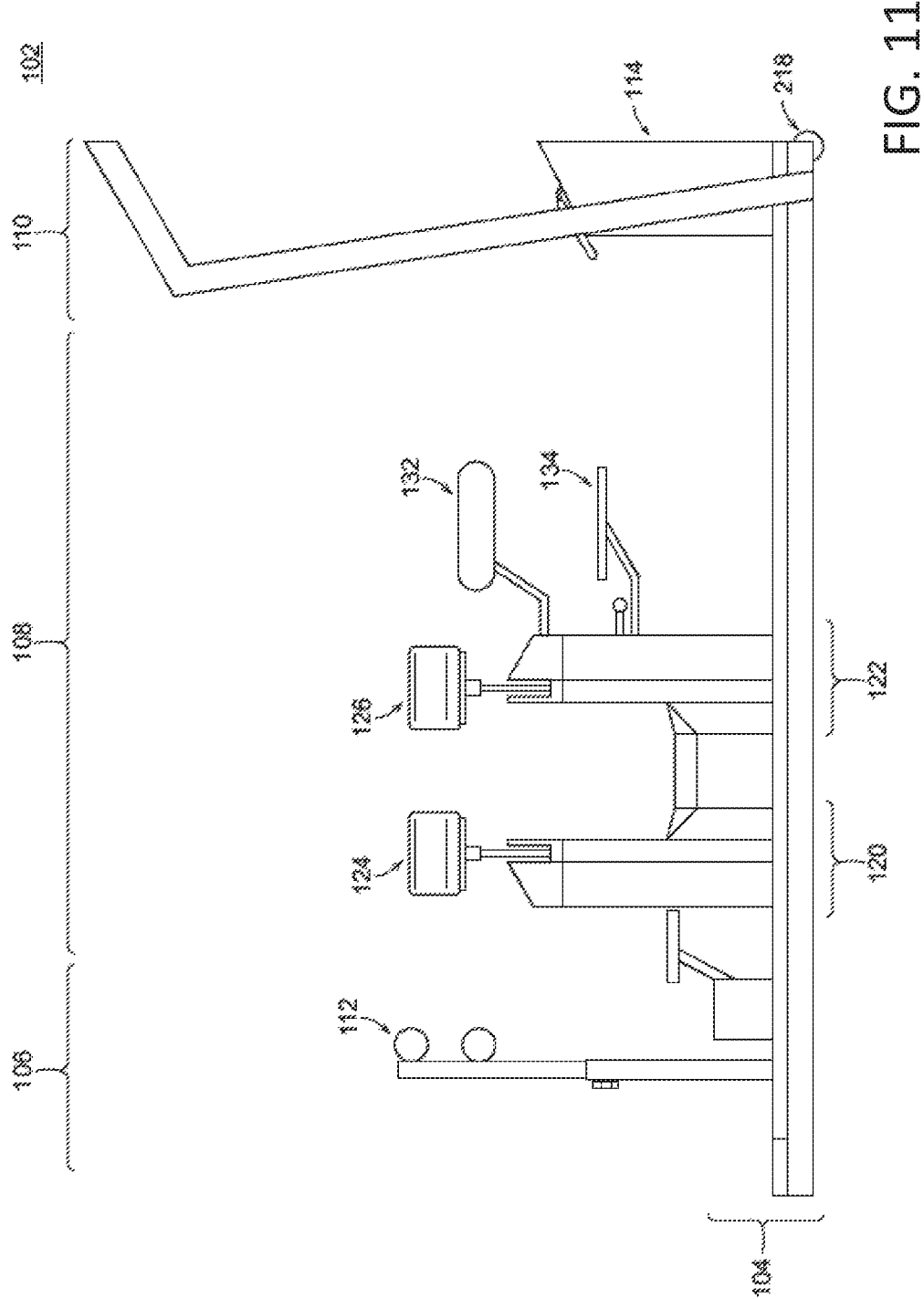

DRY SWIM SIMULATION SYSTEM

CROSS-REFERENCE TO RELATED APPLICATIONS

This application is a U.S. Non-Provisional Patent Application that claims priority from U.S. Provisional Patent Application No. 62/941,098, filed on Nov. 21, 2019, the contents of which are hereby fully incorporated by reference.

FIELD OF THE EMBODIMENTS

The field of the invention and its embodiments relate to a dry swim simulation system that allows a swimmer to learn and master swimming strokes outside of the water. In particular, the instant invention relates to a dry swim simulation system that reduces an amount of time required to master a swimming stroke by providing easy and real-time review of swimming strokes.

BACKGROUND OF THE EMBODIMENTS

Swimming is one of the most popular exercises adapted by mankind and may be considered a "complete" exercise, as it helps to maintain overall health of an individual. However, learning and mastering swimming strokes requires a significant amount of investment. For example, such investment may include: constructing a swimming pool and maintaining the swimming pool water or obtaining a gym membership. Additionally, beginner swimmers may require special attention, due to the possibility of drowning. These factors may discourage the participation of non-swimmers to learn this sport.

To remedy these problems, some have constructed dry land swimming devices that may be operated at home, at a gym, or in an office space without the need for water. These devices have been designed with the goal to teach a non-swimmer how to swim and, for an experienced swimmer, increase the swimmer's stroke efficiency and improve the swimmer's stroke technique. One such device includes the Vasa Trainer, which is a swim ergometer swimming machine. Another such device includes the Triton Swim Trainer, which is a dryland swim trainer.

Most known swimming aids work on the underlying principle that increased resistance during the swim stroke will result in increased stroke power and will, therefore, improve performance. In essence, swim performance improves as the swimmer's ability to push water backwards along a line pursued by the swimmer's body increases. Such performance depends on a variety of swim techniques, such as hand positioning, arm motion, hand pull, and body rotation, as well as the quantity of strokes taken as a function of distance, average stroke cycle rate, velocity, and elapsed time.

Whether a swimmer desires to increase his or her swim stroke technique or swim stroke efficiency, there are currently no readily available low-cost diagnostic and training tools to allow the swimmer to determine, monitor, and analyze his or her swimming performance. Though current methods exist to test and analyze swim performance, such methods are normally reserved for the elite swimmers who are invited to train or practice at multi-million dollar training centers in preparation for national or international events. Such centers use sophisticated and expensive training equipment, including swimming treadmills, video recorders, computers, and enhanced timing systems. Thus, there are no known simple and cost-effective diagnostic tools for use by the up and coming athlete in training or for the recreational and fitness swimmer that provide real-time feedback to allow the swimmer to adjust his or her swimming strokes while practicing swimming on dry land.

Review of Related Technology

U.S. Pat. No. 4,832,643 B1 describes a hand paddle for use in swimming. The paddle comprises a glove-like body having an interior recess for receiving a human hand. The body has a relatively flat bottom surface and a convex upper surface. The upper surface is cambered longitudinally and laterally so that the highest point of the upper surface is centrally located in that surface.

U.S. Pat. No. 4,830,363 A relates to a portable, adjustable apparatus for dry land swimming training. The apparatus comprises a frame supporting a bench on which the torso of a user can be supported in generally horizontal position, lever means secured to the frame behind the bench to supportably receive the user's legs, the lever means being moveable upon movement of the user's legs, and arm movement means secured to the frame for gripping by the user's hands to permit swimming-like movement of the user's arms. The arm movement means consists of a pair of retractable cords. A hand grip means is secured to one end of each cord and the other end of each cord is secured to a retractable pulley means. The bench has associated therewith means to adjust upwardly or downwardly the midsection of the bench with respect to the rest thereof.

U.S. Pat. No. 5,147,233 B1 describes a swimmer training paddle with a textured leading surface for increasing a swimmer's arm strength and hand stability. The paddle takes the form of a rigid, planar fluid resistance member having a textured first surface that directs and momentarily captures water thereon and a second surface configured to engage a swimmer's hand. The momentary capture of water by the textured paddle increases the thrust achieved with each stroke. Water resistively contacts the textured surface of the paddle for a longer period of time than does water contacting the smooth surface of a conventional paddle.

U.S. Pat. No. 5,993,356 A describes an exercise machine. The exercise machine has a user interface engaged by a user to perform exercises. A servo control motor is used as the force producing element to which the user interface is mechanically connected and in which a digital data processor, operatively connected to the electric motor, is used for monitoring the position and direction of movement of the linkage relative to the electric DC servo motor and for controlling the electric DC servo motor to operate as one of a generator or a motor depending upon the determined position and direction of movement of the linkage. The force exerted by the electric motor, whether it is operating as a motor or a generator, is dependent upon the position and direction of movement of the mechanical linkage, as well as upon the force exerted by the user on the mechanical linkage, and other parameters, depending upon which one of three modes of operation is selected.

U.S. Pat. No. 6,870,466 B1 describes a method and apparatus for monitoring the movement of an object traversing a circuit and outputting data with respect thereto. Lap events are recorded and used to calculate a total lap count, split time, and elapsed time for an event that includes the repetitive traversing of a circuit. Physiologic data is monitored in the case where the object is a person. A transponder or transmitter is affixed to a user and a signal having limited range is coupled to a communications and display device when the user comes into range of the device. Each such coupling is accumulated as lap event data. Calculations are made to display the lap count and timing information as well as physiologic data. In one embodiment, the device is implemented in a watertight housing and placed at the bottom of a swimming pool. The displayed information is visible to a swimmer wearing the transponder or transmitter. U.S. Pat. No. 6,790,164 B1 describes a swimming simulation system. An athletic training system has a user support with a vertical plane extending centrally there through. A pair of similarly configured looped tracks, one track on each side of the vertical plane, each have a common cross sectional configuration throughout and an axial shape corresponding to the intended movement of the hands of a user. A handle is slidably received on each track. Each handle includes a slider and a gripping portion. A user pushes and pulls the handle in a configuration corresponding to the configuration of the track.

U.S. Pat. No. 7,291,049 B1 describes a dry swim training system. The system includes a forward and rearward support assembly that each have a vertical fixed post with upper and intermediate apertures and a pair of vertical reciprocal posts with upper and lower and intermediate apertures. Each support assembly has an upper and a lower oscillating plate. Each plate has an upper aperture. An upper pivot pin extends there through and through the apertures of the fixed posts. Each plate has a pair of laterally aligned lower apertures. Each plate has lower pivot pins. The lower pivot pins extend there through and through intermediate and lower apertures of the reciprocal posts. A forward and a rearward cradle and pivot pins couple the cradles and upper apertures of the reciprocal posts.

U.S. Pat. No. 7,780,577 B2 describes a pendulous exercise device. The device comprises first and second swing arms pivotally coupled to a frame. The first and second swing arms extend from the frame at an angle from vertical. First and second footpads are provided pivotally coupled to the first and second swing arms, respectively. Each footpad defines a footpath comprising a forward/rearward component, an upward/downward component, and an inward/outward component.

U.S. Published Patent Application No. 2013/0130206 A1 relates to an apparatus that enables one or more people to simulate on land the action of rowing on water, which includes the simulation of an oar blade entering into and being extracted from water that is moving relative to a boat and feedback on rowing performance and technique. The apparatus includes the same fundamental elements as a real rowing boat, with one or two oar handles per person, a sliding seat, adjustable footplate and rigging that supports rowlocks. The inertia, momentum, and drag of a real boat are simulated using a damped flywheel. The percentage of torque that is transmitted between each oar handle and this flywheel is controlled using magnetic clutches, and is based upon an analysis of the position and angle of each simulated oar blade.

CN 203777639 U relates to a swimming simulator. The swimming simulator includes: a body rolling mechanism, an air exchange water tank, guide rail type paddles, and kicking pads. The body rolling mechanism can enable the body to roll around an axis from head to feet so as to achieve the effect of simulating swimming strokes in water. Moreover, the air exchange water tank is arranged below the face and is used for doing an air exchange exercise in order to match with the head. The guide rail type paddles can be designed to guide the actions of arms. The kicking pads may be used for supporting the lengths of the whole legs can be additionally arranged behind the body rolling mechanism so as to support the legs to exercise the kicking actions. The swimming simulator is meant for a beginner to master the swimming strokes on land.

CN 101766524 A describes a multi-position healthcare machine. The multi-position healthcare machine relates to the technical field of healthcare instruments and solves the technical problem of actively doing physical exercise.

Various healthcare machines and systems, including swim simulation systems, exist in the art. However, their means of operation are substantially different from the present disclosure, as the other inventions fail to solve all the problems taught by the present disclosure.

SUMMARY OF THE EMBODIMENTS

The present invention and its embodiments relate to a dry swim simulation system that allows a swimmer to learn and master swimming strokes outside of the water. In particular, the instant invention relates to a dry swim simulation system that reduces an amount of time required to master a swimming stroke by providing easy and real-time review of swimming strokes.

A first embodiment of the present invention describes a dry swim simulation system. In examples, the dry swim simulation system is foldable. The dry swim simulation system includes a base platform. In examples, the base platform includes wheels to transport the dry swim simulation system. The base platform includes a middle portion disposed between a first portion and a second portion.

The first portion of the base platform includes a foot rest located parallel to the base platform. The foot rest is configured to receive feet of a user during use of the dry swim simulation system. In another example, the first portion of the base platform includes a kicking component. The kicking component comprises a kicking mechanism.

The second portion of the base platform includes another platform that extends vertically from the base platform. A first retractable pulley includes a first grip affixed to a first retractable cable. The first grip is configured to be gripped by a left hand of the user. A second retractable pulley includes a second grip affixed to a second retractable cable. The second grip is configured to be gripped by a right hand of the user. The first retractable cable and the second retractable cable are stored within the other platform.

The middle portion of the base platform includes a first support assembly and a second support assembly. The first support assembly includes a first side disposed opposite a second side. The first side of the first support assembly is affixed to the base platform proximate the first portion of the base platform. The second side of the first support assembly comprises a first movable cradle configured to receive thighs of the user. The second support assembly includes a first side disposed opposite a second side. The first side of the second support assembly is affixed to the base platform proximate the second portion of the base platform.

The second side of the second support assembly includes a second movable cradle configured to receive a torso of the user, a computing device, and a headrest comprising an opening configured to receive a face of the user such that the user is configured to view the computing device. The headrest may include a pivot mechanism allowing the user to pivot and/or rotate a head of the user during use of the dry swim simulation system. In some examples, each of the first movable cradle and the second movable cradle include a height mechanism configured to raise or lower a body of the user and/or a tilt mechanism configured to move the body of the user to a left side or a right side.

In additional examples, the user may be configured with one or more wearable sensors. The one or more wearable sensors are configured to measure biometric parameters associated with the user during use of the dry swim simulation system. In further examples, the dry swim simulation system may include a camera configured to capture images associated with the user during use of the dry swim simulation system. In other examples, the dry swim simulation system may further include a servo motor configured to measure performance parameters associated with the user during use of the dry swim simulation system.

A second embodiment of the present invention describes a foldable and/or transportable dry swim simulation system. The foldable and/or transportable dry swim simulation system includes a base platform. The base platform has a middle portion disposed between a first portion and a second portion. The first portion of the base platform includes a foot rest located parallel to the base platform. The foot rest is configured to receive feet of a user. In another example, the first portion of the base platform includes a kicking component. The kicking component comprises a kicking mechanism.

The second portion of the base platform includes another platform extending vertically from the base platform. A first retractable pulley includes a first grip affixed to a first retractable cable. The first grip is configured to be gripped by a left hand of the user. A second retractable pulley includes a second grip affixed to a second retractable cable. The second grip is configured to be gripped by a right hand of the user. The first retractable cable and the second retractable cable are stored within the other platform.

The middle portion of the base platform includes a first support assembly and a second support assembly. The first support assembly includes a first side disposed opposite a second side. The first side of the first support assembly is affixed to the base platform proximate the first portion of the base platform. The second side of the first support assembly includes a first movable cradle configured to receive thighs of the user. The second support assembly includes a first side disposed opposite a second side. The first side of the second support assembly is affixed to the base platform proximate the second portion of the base platform.

The second side of the second support assembly includes a second movable cradle configured to receive a torso of the user, a computing device, and a headrest comprising an opening configured to receive a face of the user such that the user is configured to view the computing device. The computing device comprises at least an analysis engine. The foldable and/or transportable dry swim simulation system may also include a servo motor configured to capture performance parameters associated with the user during use of the dry swim simulation system.

The analysis engine of the computing device is configured to: receive the performance parameters from the servo motor, query a database to identify a pre-determined execution level associated with each of the performance parameters, and compare each of the performance parameters to the pre-determined execution level associated with each of the performance parameters to identify if each of the performance parameters meets, exceeds, or fails to exceed the pre-determined execution level associated with each of the performance parameters. The analysis engine of the computing device is then configured to display each of the performance parameters and a result of the comparison to the user during use of the dry swim simulation system. The analysis engine of the computing device is also configured to: transmit the performance parameters and the result of the comparison to a database for storage and to another user associated with another computing device. In response to receiving feedback data from the other user, the analysis engine of the computing device is configured to display the feedback data to the user (e.g., the swimmer) during use of the dry swim simulation system.

Additionally, the user may be configured with one or more wearable sensors. The one or more wearable sensors may be configured to measure biometric parameters associated with the user during use of the dry swim simulation system. The analysis engine of the computing device is configured to: receive the biometric parameters from the one or more wearable sensors, query the database to identify a pre-determined execution level associated with each of the biometric parameters, and compare each of the biometric parameters to the pre-determined execution level associated with each of the biometric parameters to identify if each of the biometric parameters meets, exceeds, or fails to exceed the pre-determined execution level associated with each of the biometric parameters. The analysis engine of the computing device is further configured to display each of the biometric parameters and a result of the comparison to the user during use of the dry swim simulation system. The analysis engine of the computing device is also configured to transmit the biometric parameters and the result of the comparison to a database for storage and to another user associated with another computing device. In response to receiving feedback data from the other user, the analysis engine of the computing device is configured to display the feedback data to the user (e.g., the swimmer) during use of the dry swim simulation system.

In additional examples, the foldable and/or transportable dry swim simulation system may include a camera configured to capture images associated with the user during use of the dry swim simulation system. The analysis engine of the computing device is configured to: receive the images from the camera, query the database and compare each of the captured images to images associated with proper performance of a given swim stroke, and display the comparison of the captured images and the images associated with proper performance of the given swim stroke to the user during use of the dry swim simulation system.

In further examples, the computing device additionally comprises a virtual reality engine. In this examples, the user may be configured with virtual reality glasses or goggles such that the user engages in a virtual reality experience when the user views the computing device.

In general, the present invention succeeds in conferring the following benefits and objectives.

It is an object of the present invention to provide a dry swim simulation system that is cost-effective.

It is an object of the present invention to provide a dry swim simulation system that is foldable and/or portable.

It is an object of the present invention to provide a dry swim simulation system that allows a user to engage in short axis swim strokes and/or long axis swim strokes on land.

It is an object of the present invention to provide a dry swim simulation system that provides flexibility in terms of timing and duration of swimming.

It is an object of the present invention to provide a dry swim simulation system that eliminates a possibility of injuries for beginner swimmers.

It is an object of the present invention to provide a dry swim simulation system that mimics body movements of the swimmer.

It is an object of the present invention to provide a dry swim simulation system that improves one's body fitness, swimming reflexes, body coordination during the swimming, and body balance.

It is an object of the present invention to provide a dry swim simulation system that captures and analyzes quantitative information about a swimmer's swim stroke, including elapsed time, stroke rate, cycle time, distance swam, velocity, and other indicators of a swimmers performance.

It is an object of the present invention to provide a dry swim simulation system that captures and analyzes both biometric parameters and performance parameters of a user during use of the dry swim simulation system.

It is an object of the present invention to provide a dry swim simulation system that provides real-time feedback to the swimmer to allow the swimmer to adjust his/her swimming strokes while practicing swimming on dry land.

It is an object of the present invention to provide a dry swim simulation system that provides an alternative to regular exercise, as the dry swim simulation system allows the swimmer to burn more fat in comparison with similar exercises performed in water.

BRIEF DESCRIPTION OF THE DRAWINGS

FIG. 11 depicts a perspective and schematic view of a transportable dry swim simulation system comprising one or more wheels, in accordance with embodiments of the present invention.

DESCRIPTION OF THE PREFERRED EMBODIMENTS

Figure 1:
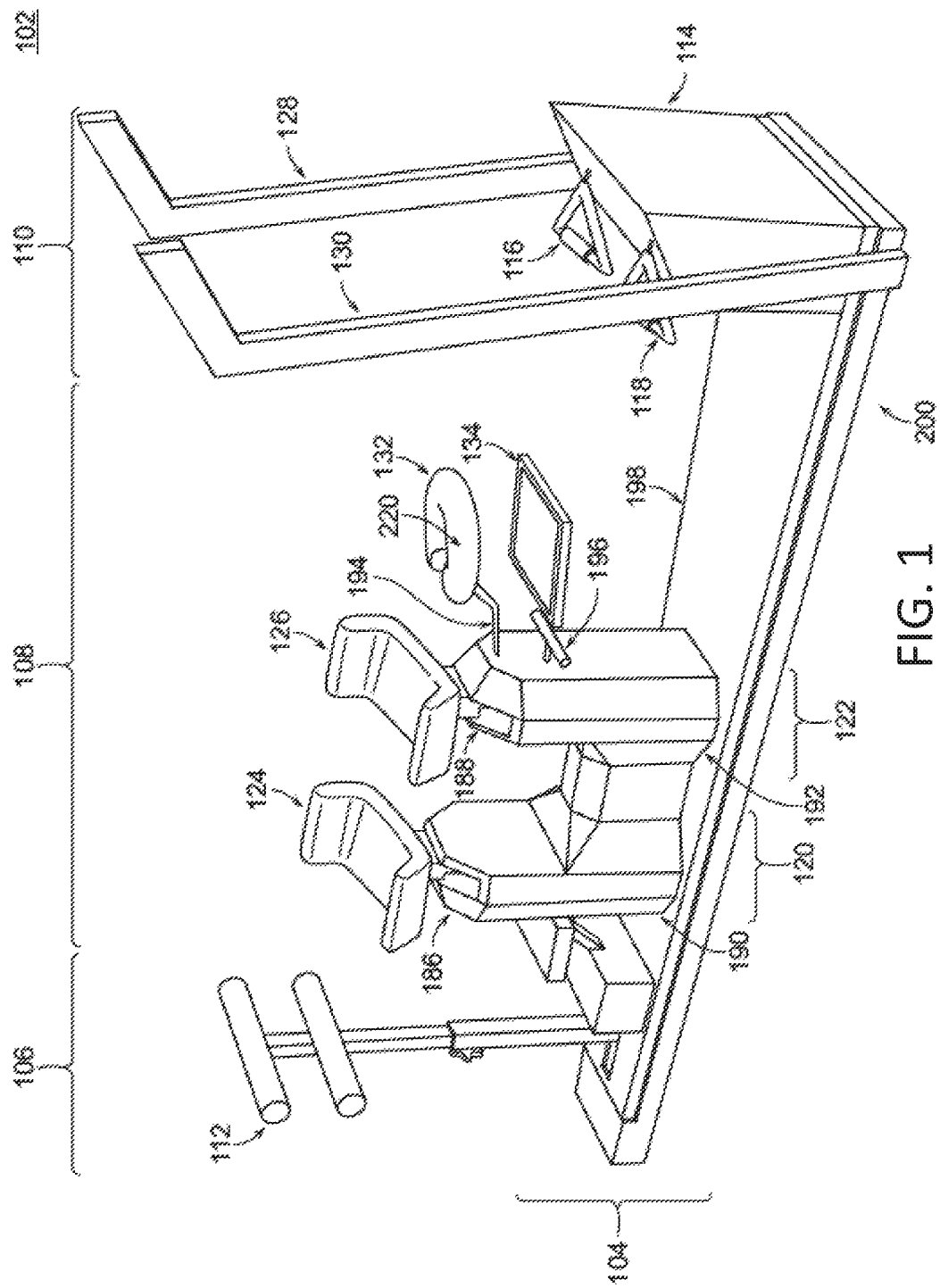
FIG. 1 depicts a perspective and schematic view of a dry swim simulation system, in accordance with embodiments of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
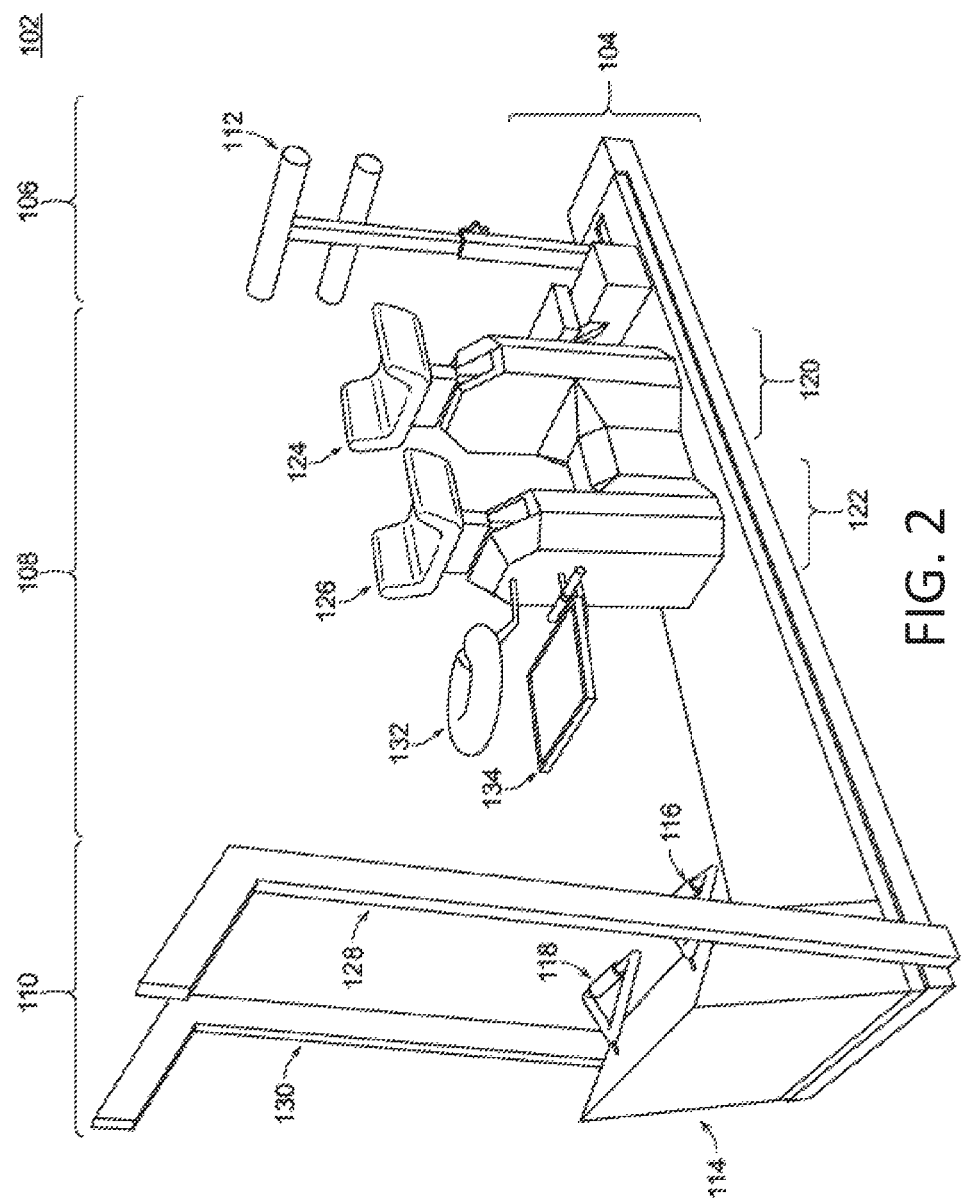
FIG. 2 depicts another perspective and schematic view of a dry swim simulation system, in accordance with embodiments of the present invention.

A perspective and schematic view of a dry swim simulation system 102 is depicted at least in FIG. 1 and FIG. 2. The dry swim simulation system 102 is configured as a dry land swimming simulator that provides a user 160 (of FIG. 4, FIG. 5, FIG. 6, FIG. 7, FIG. 8, FIG. 9, FIG. 10A, and FIG. OB) with a feeling of swimming in water. The dry swim simulation system 102 may be used by non-swimmers, beginner swimmers, and experienced swimmers.

Figure 4:
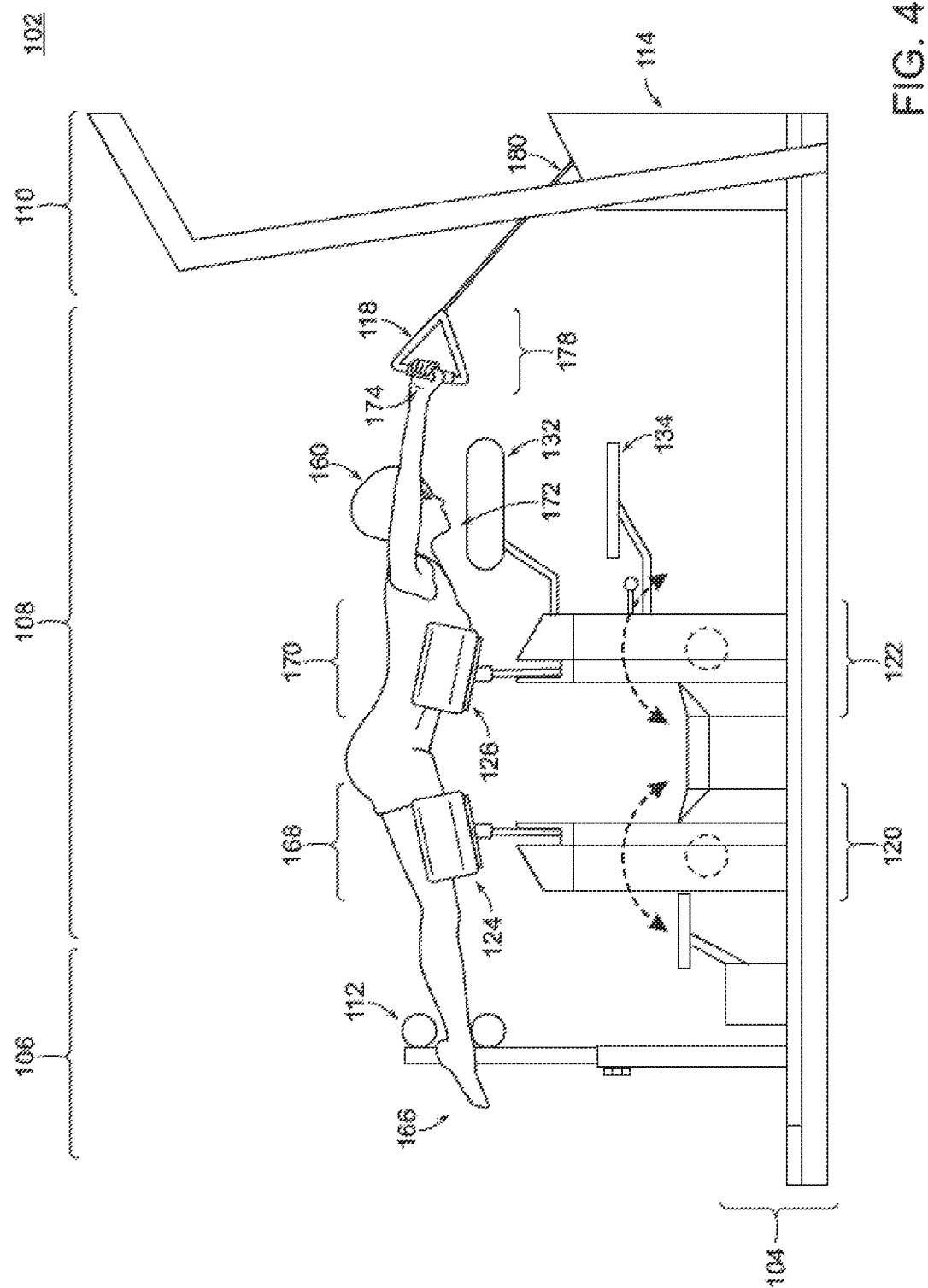
FIG. 4 depicts a perspective and schematic view of a user engaging in short axis swim strokes (e.g., butterfly strokes or breaststrokes) with a dry swim simulation system, in accordance with embodiments of the present invention.
Figure 5:
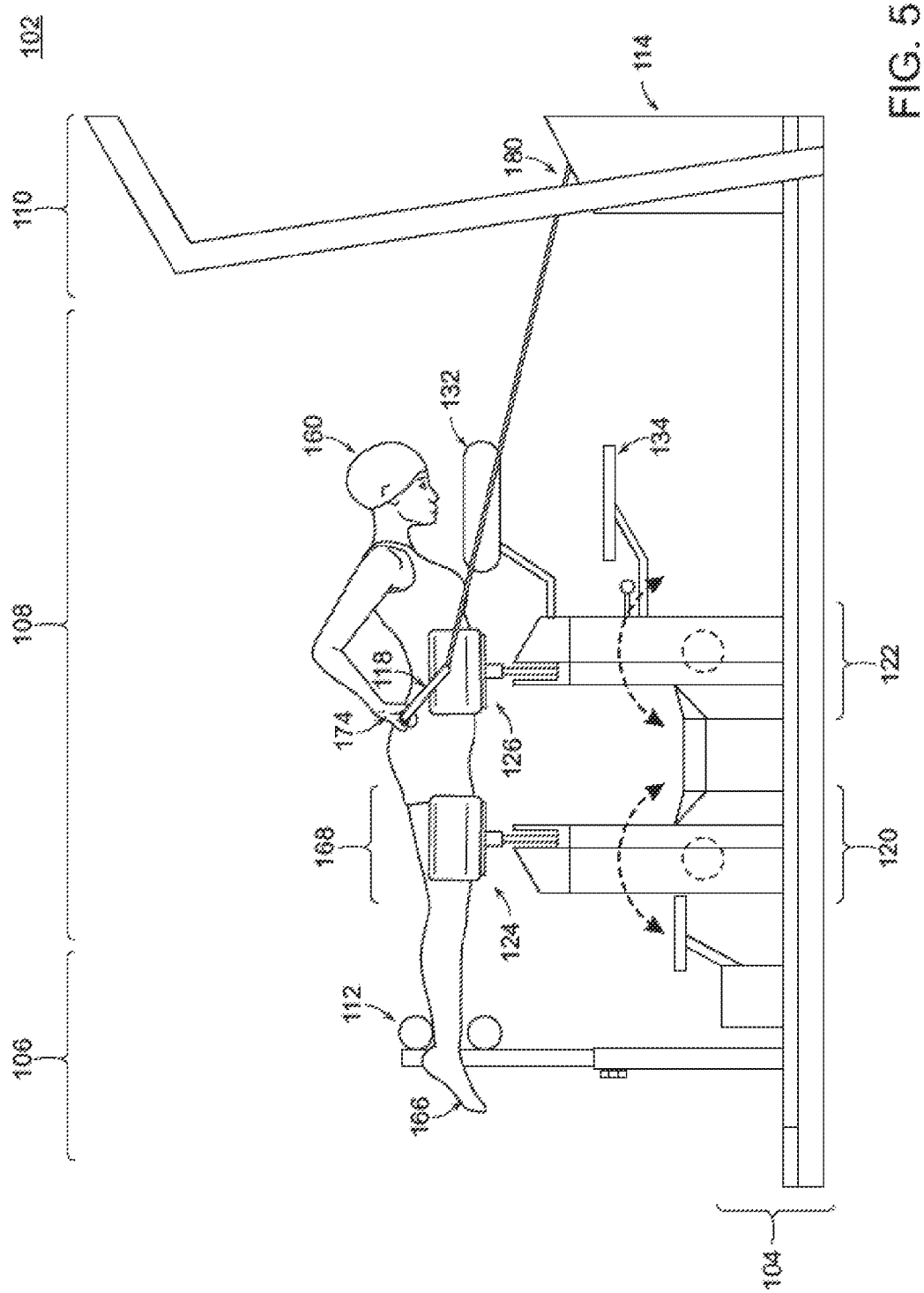
FIG. 5 depicts a perspective and schematic view of a user engaging in short axis swim strokes (e.g., butterfly strokes or breaststrokes) with a dry swim simulation system and vertical movement of a first movable cradle and a second movable cradle, in accordance with embodiments of the present invention.
Figure 6:
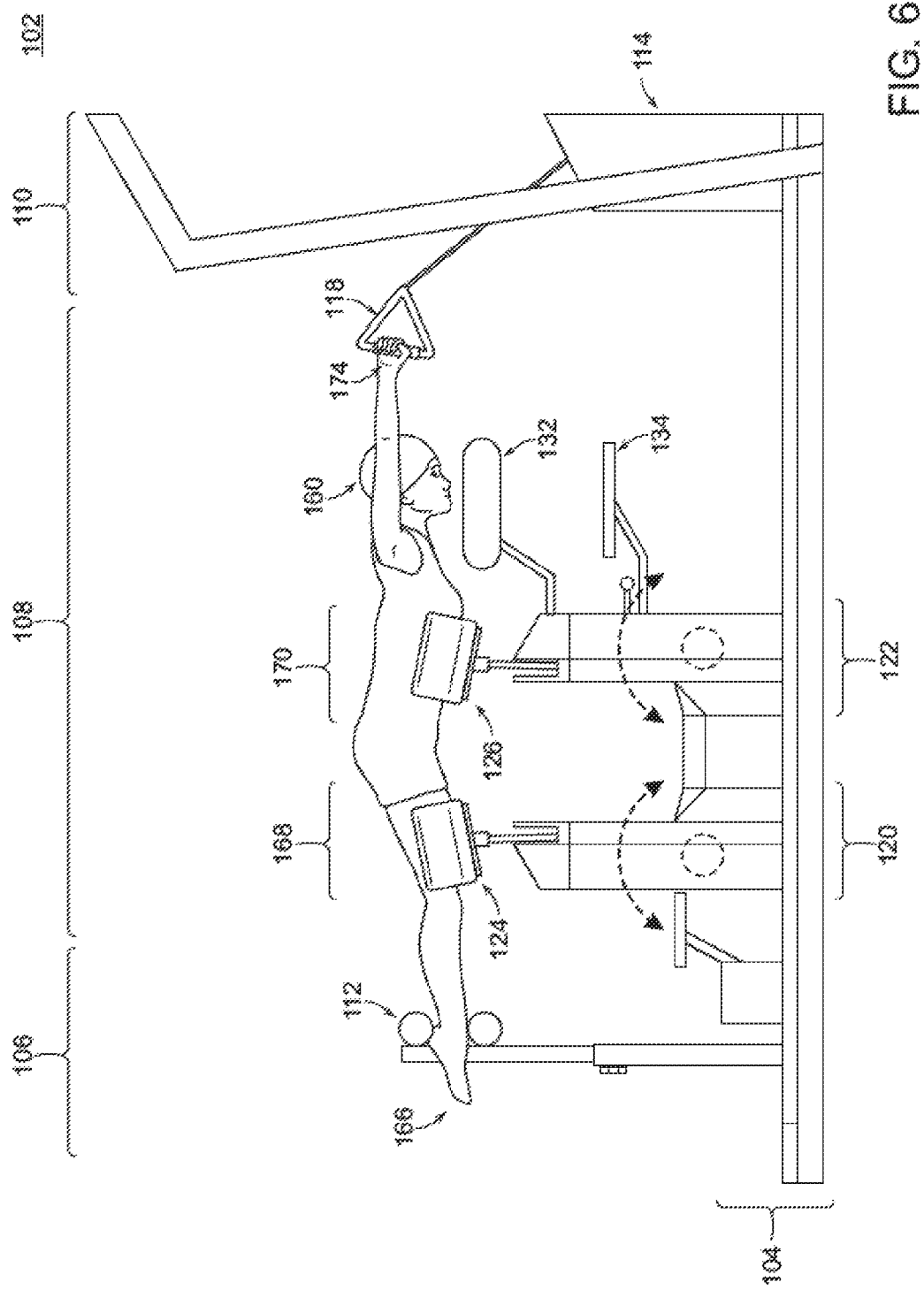
FIG. 6 depicts another perspective and schematic view of a user engaging in short axis swim strokes (e.g., butterfly strokes or breaststrokes) with a dry swim simulation system and vertical movement of a first movable cradle and a second movable cradle, in accordance with embodiments of the present invention.
Figure 7:
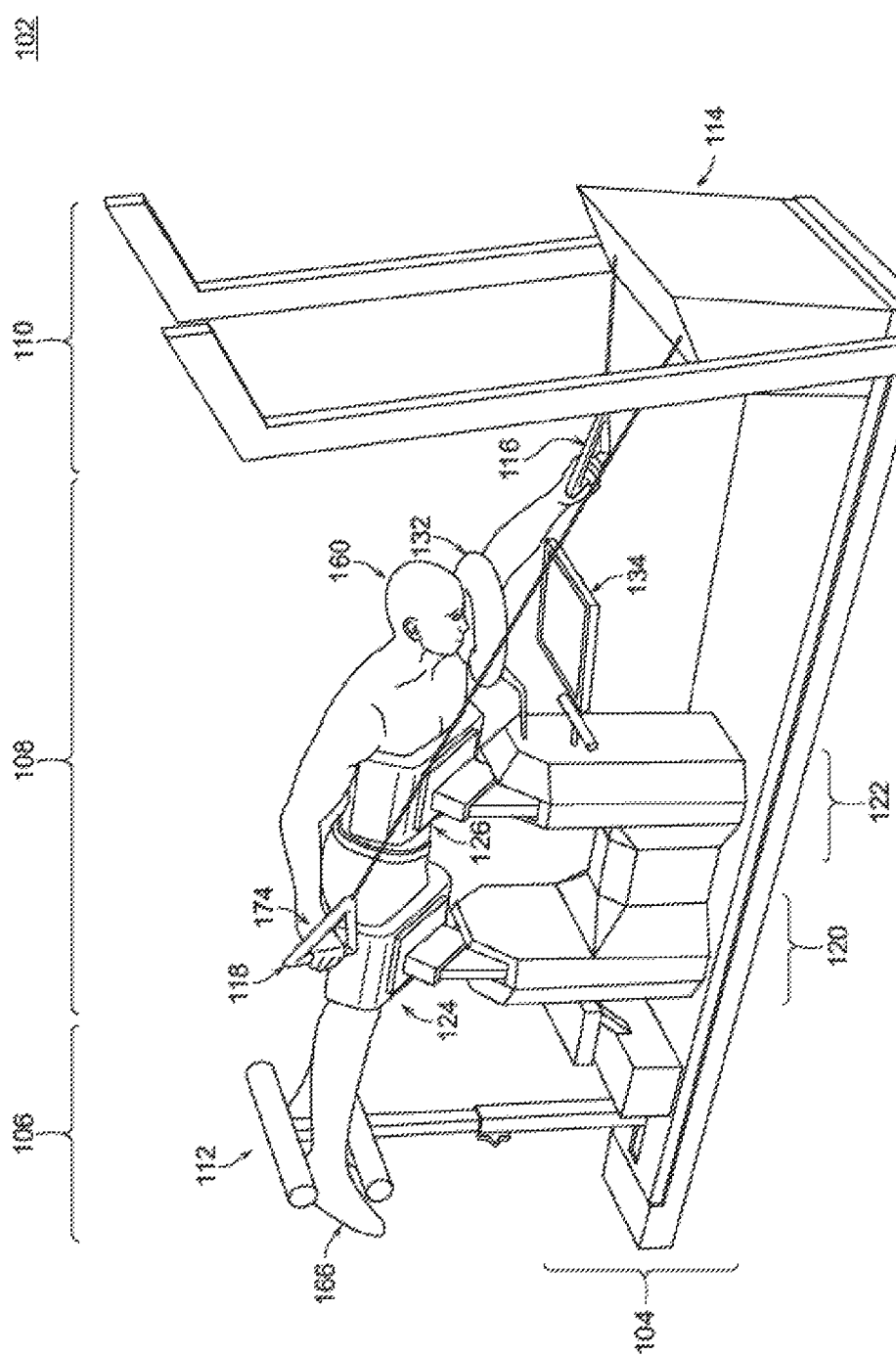
FIG. 7 depicts a perspective and schematic view of a user engaging in long axis swim strokes (e.g., freestyle strokes) with a dry swim simulation system and rotation of a first movable cradle and a second movable cradle, in accordance with embodiments of the present invention.
Figure 8:
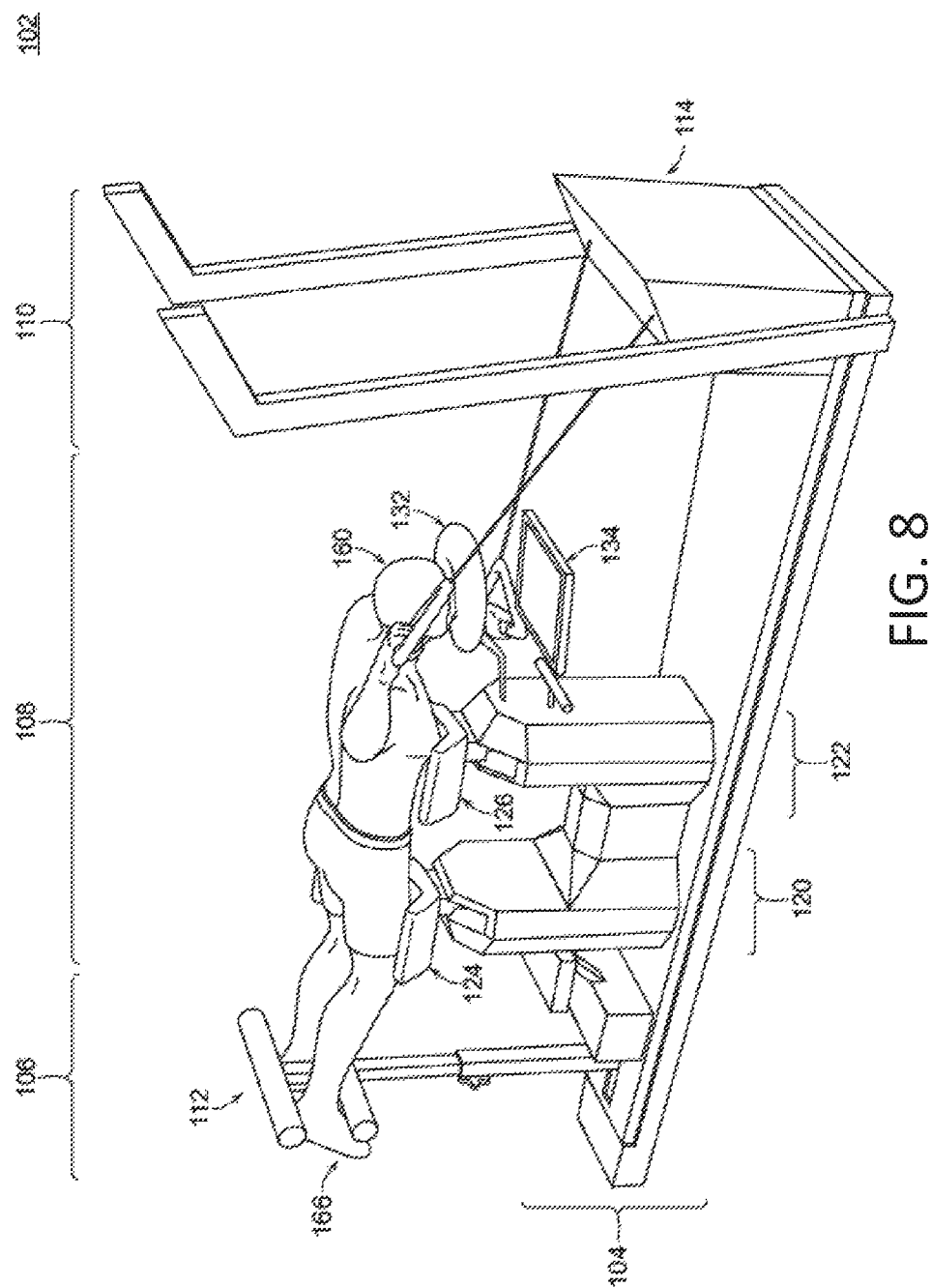
FIG. 8 depicts a perspective and schematic view of a user viewing a computing device through an opening in a headrest while engaging in long axis swim strokes (e.g., freestyle strokes) with a dry swim simulation system, in accordance with embodiments of the present invention.
Figure 9:
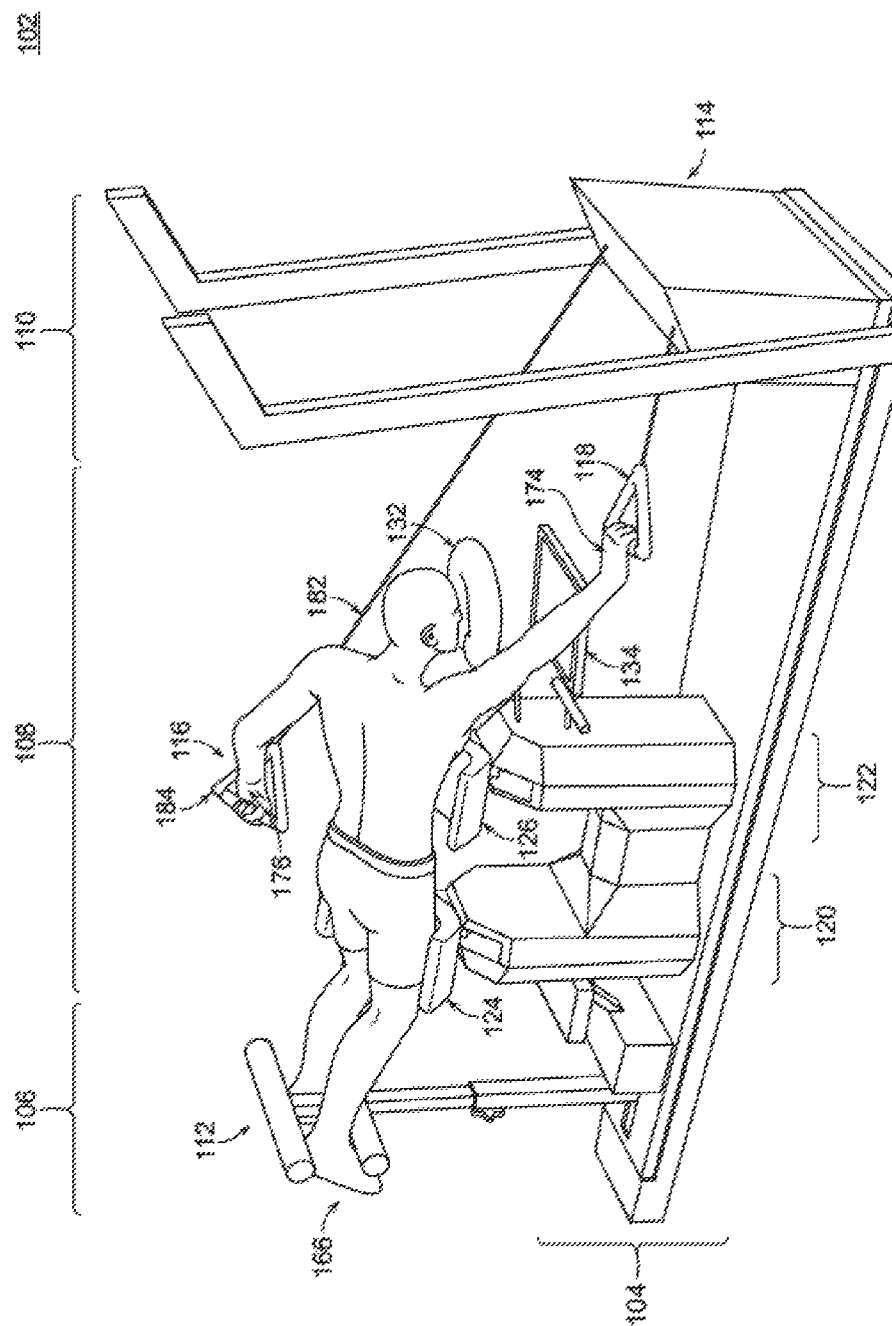
FIG. 9 depicts another perspective and schematic view of a user viewing a computing device through an opening in a headrest while engaging in long axis swim strokes (e.g., freestyle strokes) with a dry swim simulation system, in accordance with embodiments of the present invention.

Swimming strokes may be categorized into two types of strokes based on movement of the body—long axis swim strokes and short axis swim strokes. The long axis swim strokes include freestyle strokes and backstrokes, where the body of the user rotates from side to side. The short axis swim strokes include butterfly strokes and breaststrokes, where the body of the user moves forward in a wave-like motion. The dry swim simulation system 102 may be used by the user 160 for the long axis swim strokes (as depicted in FIG. 7, FIG. 8, and FIG. 9) and for the short axis swim strokes (as depicted in FIG. 4, FIG. 5, and FIG. 6).

In general, the dry swim simulation system 102 supports the user 160 in an optimal streamlined body position and also simulates swimming with gravity on land. The dry swim simulation system 102 provides the user 160 with a real feeling of swimming in the water by using the concept of a "virtual pivot point" and negotiates a lowered virtual pivot point for swimming strokes. The lowered virtual pivot point or any other existing streamline body support system that negotiates and incorporates the desired body simulation streamline position is a basis for efficiently swimming on land.

As defined herein, the "virtual pivot point" is a point which is movable during a compression process and acts as an instant center of rotation. During the compression process, the real axle not only performs compound rotation, but also performs horizontal and vertical shift. These shifts are responsible for rotational and translational movements. The virtual pivot point helps in locating the path of the real axle.

The virtual pivot point is determined as an intersection of two straight lines in a system with four-pivot-points. In such systems, the first straight line connects the Horst link joint and the main rear swing arm bearing, and the second straight line joins the hinge point of the seat tube linkage and the fastening point for the linkage on the main frame. During locomotion on land, since the body is not surrounded by water, the body does not passively align its orientation. To mimic the situation in water, the dry swim simulation system 102 designs the virtual pivot point above a center of mass of the user 160. It should be appreciated that the virtual pivot point described herein is adjustable for weight and length.

As depicted in FIG. 1 and FIG. 2, the dry swim simulation system 102 may include a base platform 104. The base platform 104 may comprise a first side 198 disposed opposite a second side 200, as depicted in FIG. 1. The first side 198 of the base platform 104 is configured to receive numerous components of the dry swim simulation system 102. The second side 200 of the base platform 104 is configured to contact a surface of a floor. In general, the base platform 104 may include a middle portion 108 disposed between a first portion 106 and a second portion 110.

In examples, the first portion 106 of the base platform 104 may include a foot rest 112 that is located parallel to the base platform 104. The foot rest 112 may be configured to receive feet 166 of the user 160 (of FIG. 4, FIG. 5, FIG. 6, FIG. 7, FIG. 8, and FIG. 9) when the user 160 is engaging with the dry swim simulation system 102. Though the foot rest 112 is depicted in FIG. 1, FIG. 2, FIG. 4, FIG. 5, FIG. 6, FIG. 7, FIG. 8, FIG. 9, FIG. 10A, FIG. 10B, and FIG. 11, in some examples, the foot rest 112 may be replaced with a kicking component 300 that comprises a kicking mechanism 302 (of FIG. 3). The kicking mechanism 302 of FIG. 3 may measure and coordinate leg stabilization and kicking of the user 160 while the user 160 is engaging with the dry swim simulation system 102. Moreover, in some examples, the kicking component 300 may be an interchangeable flutter kicker piece, such that the kicking mechanism 302 of the kicking component 300 simulates an up and down flutter kick, while the body of the user 160 is stabilized in a streamline position. It should be appreciated that the kicking mechanism 302 may measure numerous biometric parameters and/or engage in biomechanical monitoring of the user 160.

The second portion 110 of the base platform 104 may include another platform 114 that extends vertically from the first side 198 of the base platform 104. The other platform 114 may comprise a first shaft 128 and a second shaft 130 extending vertically from the other platform 114 and away from the first side 198 of the base platform 104 (of FIG. 1 and FIG. 2). The second portion 110 of the base platform 104 may also include a first retractable pulley 116 (of FIG. 1, FIG. 2, FIG. 7, FIG. 9, FIG. 10A, and FIG. 10B) and a second retractable pulley 118 (of FIG. 1, FIG. 2, FIG. 4, FIG. 5, FIG. 6, FIG. 7, and FIG. 9).

The first retractable pulley 116 (of FIG. 1, FIG. 2, FIG. 7, FIG. 9, FIG. 10A, and FIG. 10B) comprises a first grip 184 affixed to a first retractable cable 182 (as depicted in FIG. 9). The first grip 184 of the first retractable pulley 116 may be gripped by a left hand 176 of the user 160 (as depicted in FIG. 9). The second retractable pulley 118 (of FIG. 1, FIG. 2, FIG. 4, FIG. 5, FIG. 6, FIG. 7, and FIG. 9) may include a second grip 178 affixed to a second retractable cable 180, as depicted in FIG. 4. The second grip 178 of the second retractable pulley 118 may be configured to be gripped by a right hand 174 of the user 160, as depicted in FIG. 4. The first grip 184 and the second grip 178 may comprise a soft rubber or any other elastic material that provides the necessary resistance to the users hands while swimming.

The first retractable cable 182 (of FIG. 9) and the second retractable cable 180 (of FIG. 4) may be housed in the other platform 114. A flexibility of the first retractable cable 182 and the second retractable cable 180 may be increased or decreased by altering the elasticity of the material comprising the first retractable cable 182 and the second retractable cable 180, respectively. In examples, the other platform 114 may additionally include an accelerometer 202 (of FIG. 3) or another closed loop system for measuring shoulder, arm, hand, and finger biomechanical performance metrics of the user 160. For example, the accelerometer 202 may measure arm strength and power of the user 160 while engaging with the dry swim simulation system 102.

The middle portion 108 of the base platform 104 may include a first support assembly 120 and a second support assembly 122, as depicted in FIG. 1, FIG. 2, FIG. 4, FIG. 5, FIG. 6, FIG. 7, FIG. 8, FIG. 9, and FIG. 11. Each of the first support assembly 120 and the second support assembly 122 may include a first side disposed opposite a second side. The first side 190 of the first support assembly 120 may be affixed to the base platform 104 proximate the first portion 106 of the base platform 104, as depicted in FIG. 1. The second side 186 of the first support assembly 120 may comprise a first movable cradle 124 configured to receive thighs 168 of the user 160, as depicted in FIG. 1 and FIG. 4.

Moreover, as depicted in FIG. 1, the first side 192 of the second support assembly 122 may be affixed to the base platform 104 proximate the second portion 110 of the base platform 104. The second side 188 of the second support assembly 122 may comprise numerous components, such as a second movable cradle 126 configured to receive a torso 170 (e.g., a chest) of the user 160 (as depicted in FIG. 4). In examples, the first movable cradle 124 and/or the second movable cradle 126 may be configured as a horizontal body plate or a bench, among other configurations.

Figure 3:
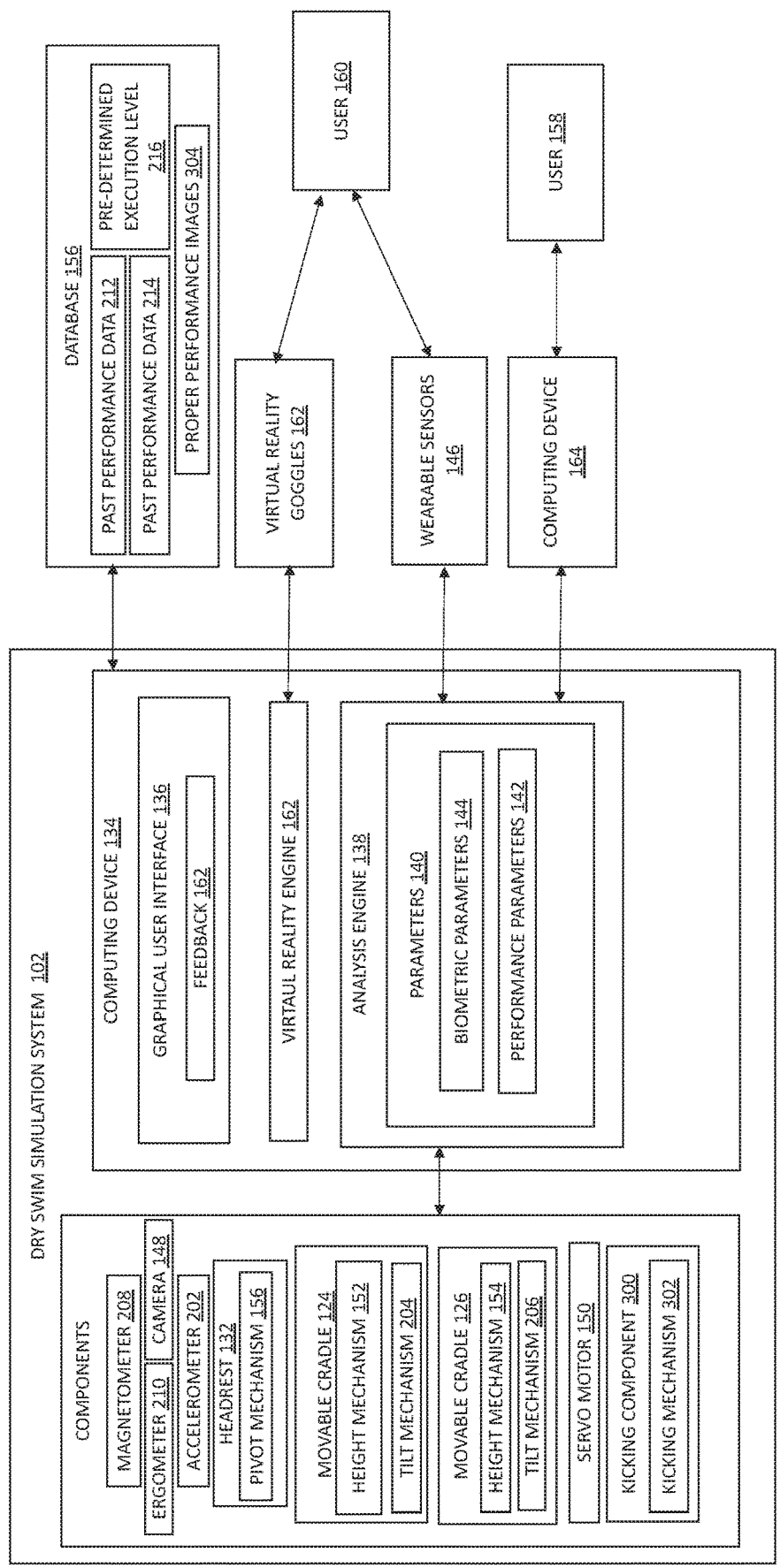
FIG. 3 depicts a block diagram of numerous components of a dry swim simulation system, in accordance with embodiments of the present invention.

In examples, the first movable cradle 124 may comprise a first height mechanism 152 and/or a first tilt mechanism 204 (of FIG. 3). The second movable cradle 126 may comprise a second height mechanism 154 and/or a second tilt mechanism 206 (of FIG. 3). The first height mechanism 152 may be configured to raise or lower the thighs 168 of the user 160. The second height mechanism 154 may be configured to raise or lower the torso 170 of the user 160. The first tilt mechanism 204 and the second tilt mechanism 206 may be configured to move the first movable cradle 124 or the second movable cradle 126 to a left side or a right side to help improve the swimming strokes and increase the stroke strength of the user 160.

The mechanisms of the first movable cradle 124 and/or the second movable cradle 126 allow the body of the user 160 to roll in such a way that the user 160 experiences the feeling of swimming in water, while not actually being located in water. It should be appreciated that, in some examples, one or more of the first height mechanism 152, the first tilt mechanism 204, the second height mechanism 154, and/or the second tilt mechanism 206 may be used simultaneously.

More specifically, each of the first support assembly 120 and the second support assembly 122 may include a vertical post. Each of the vertical posts comprises upper apertures and intermediate apertures. Further, each of the first support assembly 120 and the second support assembly 122 may include a pair of vertical reciprocal posts having lower apertures, upper apertures, and intermediate apertures. Additionally, each of the first support assembly 120 and the second support assembly 122 may include an upper oscillating plate and a lower oscillating plate. Each upper oscillating plate and each lower oscillating plate may comprise an upper aperture with an upper pivot pin extending therethrough and through apertures of the fixed posts. Moreover, each upper oscillating plate and each lower oscillating plate may comprise a pair of laterally aligned lower apertures with lower pivot pins extending therethrough and through intermediate and lower apertures of the pair of vertical reciprocal posts. The various adjustable pins allow free-movement of various parts of the dry swim simulation system 102. The configuration of these components is discussed further in U.S. Pat. No. 7,291,049 B1.

The second side 188 of the second support assembly 122 may also comprise a headrest 132 located at a first location 194 and a computing device 134 located at a second location 196, as depicted in FIG. 1. The first location 194 is closer than the second location 196 to the second side 188 of the second support assembly 122, such that the headrest 132 is located closer to the second side 188 of the second support assembly 122 than the computing device 134. In another example, the headrest 132 may be located at the second location 196 and the computing device 134 may be located at the first location 194, such that the computing device 134 is located closer to the second side 188 of the second support assembly 122 than the headrest 132. As such, the location of these components is modifiable.

Since, in swimming, proper head position is key to swimming efficiently, the headrest 132 is a key component of the dry swim simulation system 102. The headrest 132 is ergonomically designed to sync as the user 160 would in the water and maintain a small profile for least resistance to oncoming water. It should be appreciated that elimination of buoyancy is calculated to balance out gravity. Additionally, the headrest 132 may comprise a pivot mechanism 156 (of FIG. 3) that allows the user 160 to pivot and/or rotate his/her head when using the dry swim simulation system 102 for the user 160 to learn proper breathing techniques for a particular swim stroke. The headrest 132 may also eliminate or reduce neck fatigue of the user 160 while the user 160 is engaging with the dry swim simulation system 102.

In examples, the headrest 132 may comprise an opening 220 (of FIG. 1) in a center or substantially in the center of the headrest 132 such that when the user 160 is engaging with and using the dry swim simulation system 102, the headrest 132 receives the face 172 (of FIG. 4) of the user 160. As explained supra, the location of the headrest 132 and/or the computing device 134 is modifiable.

When the user 160 is engaging in freestyle strokes, butterfly strokes, or breaststrokes, the opening 220 of the headrest 132 receives the face 172 of the user 160 such that the user 160 is laying (e.g., on the first movable cradle 124 and the second movable cradle 126) parallel to and is facing the first side 198 of the base platform 104, as shown in FIG. 4, FIG. 5, FIG. 6, FIG. 7, FIG. 8, FIG. 9, FIG. 10A, and FIG. 10B. In this scenario, the headrest 132 is located at the first location 194 and the computing device 134 is located at the second location 196. When the user 160 is engaging in backstrokes, the opening 220 of the headrest 132 receives the face 172 of the user 160 such that the user 160 is laying (e.g., on the first movable cradle 124 and the second movable cradle 126) parallel to and is facing away from the first side 198 of the base platform 104. In these configurations, the user 160 may view the computing device 134 through the opening 220 in the headrest 132. In this scenario, the headrest 132 is located at the second location 196 and the computing device 134 is located at the first location 194.

It should be appreciated that the computing device 134 of the dry swim simulation system 102 may be a computer, a laptop computer, a smartphone, and/or a tablet, among other examples not explicitly listed herein. The computing device 134 may include numerous applications and/or engines, such as an analysis engine 138 and/or a virtual reality engine 162, among others. The analysis engine 138 and/or the virtual reality engine 162 may be an application, a software program, a service, or a software platform configured to be executable on the computing device 134.

The computing device 134 may also comprise a graphical user interface (GUI) 136. The user 160 may interact with the computing device 134 via the GUI 136. In examples, the user 160 may interact with the computing device 134 via the GUI 136 to engage with one or more applications executable on the computing device 134. The one or more applications may allow the user 160 to interact with other users associated with other exercise devices (e.g., a treadmill, a stationary bike, a rowing machine, etc.) for instruction and/or to share workouts, among other reasons. The other users may share a physical location with the user 160 or may be located at a differing location. Such engagement may include audio engagement, visual engagement, and/or textual engagement.

In additional examples, the user 160 may interact with the analysis engine 138 of the computing device 134 via the GUI 136 to input a desired stroke rate for a particular swimming stroke. In response to receiving the desired stroke rate from the user 160, the analysis engine 138 may query a database 156 that stores past performance data 212 associated with the user 160 engaging with the dry swim simulation system 102 and may display, via the computing device 134, a notification (not shown) each time the stroke is to be performed to achieve the desired stroke rate. The notification may be a textual notification, a visual notification, and/or an audio notification. In other examples, the first movable cradle 124 and/or the second movable cradle 126 may include a vibration mechanism (not shown) that vibrates the first movable cradle 124 and/or the second movable cradle 126 to notify the user 160 each time the stroke is to be performed.

In other examples, the user 160 may be wearing virtual reality glasses or goggles 162 (of FIG. 3) such that the virtual reality engine 162 of the computing device 134 allows the user 160 to engage in a virtual reality experience when the user 160 is engaging with the dry swim simulation system 102 and views the computing device 134. Moreover, the virtual reality engine 162 of the computing device 134 may include one or more integratable plugins that allow the user 160 to engage with the dry swim simulation system 102 in numerous virtual reality swimming environments, such as in the ocean, in space, in a swimming lane, or competing in a swimming race or competition against another user (not shown). Such other user may share the physical location with the user 160 or may be present at another physical location.

In further examples, the virtual reality engine 162 may comprise a global positioning system (GPS) component (not shown) such that the virtual reality engine 162 may provide the user 160 with a location-specific virtual reality environment. Such location-specific virtual reality environment may be viewed and/or shared with other users (not shown). In another aspect of the present embodiment, voice recorders, microphones, and/or any other audio device may be associated with the virtual reality engine 162 to transmit audio to the user 160 while enjoying the virtual reality environment.

The examples of the virtual reality swimming environments are non-exhaustive and are provided for illustrative purposes only.

Moreover, in other examples, the computing device 134 may provide a metronome functionality to help the user 160 swim at a certain rate or pace set by the user 160 or another user 158. In other examples, the computing device 134 may function in a triathlon mode. In some examples, a stationary bicycle or a treadmill may be affixed to the dry swim simulation system 102 via any electronic and/or mechanical means. In other examples, the stationary bicycle and the treadmill may be affixed to the dry swim simulation system 102 via any electronic and/or mechanical means to create a trilogy of machines. Such trilogy configuration allows the user 160 to engage in swimming, running, and/or bicycling training for such triathlon.

The analysis engine 138 of the computing device 134 may be configured to receive and analyze quantitative information and/or the parameters 140 (of FIG. 3) associated with the swim stroke of the user 160 from one or more electronic or mechanical components of the dry swim simulation system 102. For example, and as depicted in FIG. 3, the one or more electronic or mechanical components of the dry swim simulation system 102 may include a magnetometer 208, a servo motor 150, a camera 148, an ergometer 210, an accelerometer 202, the kicking mechanism 302 of the kicking component 300, the pivot mechanism 156 of the headrest 132, one or more wearable sensors 146 configured to be worn by the user 160, and/or other mechanisms that generate data for swimmers to improve swimming ability on land. It should be appreciated that the listing of the one or more electronic or mechanical components are non-exhaustive and the examples provided herein are for illustrative purposes only.

The parameters 140 may include all physical, visual, mental, and performance metrics that benefit learning, teaching, coaching, training, drilling, workouts, and interactivity for swimmers to improve the efficiency of swimming. In examples, the parameters 140 may include performance parameters 142 and/or biometric parameters 144. In further examples, the analysis engine 138 of the computing device 134 may comprise one or more algorithms used to analyze the quantitative information and/or the parameters 140 associated with the swim stroke of the user 160 from one or more electronic or mechanical components of the dry swim simulation system 102.

As defined herein, the "servo motor" is a sensor coupled rotary actuator which allows a precise control of velocity, acceleration, and angular or linear position of an object. The servo motor 150 is a tool to measure the position of an object in real-time. Servo motors may be used in robotics, automated manufacturing, and CNC machinery. The servo motor 150 receives an analogue signal or digital input and measures the final position of the motion based on a position feedback mechanism (not shown). The servo motor 150 is fitted with an encoder (not shown) that assists in detection of speed and position of the motor and measures the rotor position with a very-high degree of resolution.

The servo motor 150 may also be used in the measurement of torque generated during a rotation motion. To accomplish this, a sensor (not shown) to measure torque is mounted on the gearhead and the sensor measures the torque produced during the rotation mechanism. An analogue amplifier (not shown) than amplifies the signal may be received by the sensor. As the motor in the servo meter 150 rotates, the resistance of the potentiometer increases which promotes a change in the electric circuitry and allows a precise movement to happen in a particular direction.

Further, the present invention utilizes a combination of the servo meter 150 described herein and the attached sensors (not shown) for measurement of torque, speed control, and accurate measurement of the position of the user 160. More specifically, the servo meter 150 is configured to determine the performance parameters 142 associated with the user 160 during use of the dry swim simulation system 102.

The performance parameters 142 may include: a torque of the user 160, a speed of the user 160, a velocity of the user 160, an acceleration of the user 160, an angular position of the user 160, a linear position of the user 160, a rotation angle of a body part of the user 160, a distance per stroke of the user 160, an acceleration rate of the user 160 per stroke torque output, a power output of the user 160, a strength output of the user 160, a stroke rate of the user 160, an elapsed time the user 160 engages with the dry swim simulation system 102, and/or a distance swam by the user 160, among other performance parameters 142 not explicitly listed herein. In examples, the rotation angle of the body part of the user 160 may include the rotation angle of the shoulder and/or the rotation angle of an elbow, among others not explicitly listed herein.

The camera 148 and the one or more wearable sensors 146 of FIG. 3 will be discussed further. In some examples, the camera 148 may be a real-time camera that is configured to capture images (not shown) associated with the user 160 during use of the dry swim simulation system 102. These images may capture one or more body parts of the user 160. For example, the images may capture a linear position of the user 160, a linear position of an arm of the user 160, a linear position of a hand position of the user 160, etc. when engaging in a given swim stroke. In other examples, the images may capture a rotation of the user 160, a rotation of an arm of the user 160, a rotation of a hand position of the user 160, etc. when engaging in a given swim stroke. It should be appreciated that in some examples, the camera 148 may additionally or alternatively capture video associated with the user 160 during use of the dry swim simulation system 102.

In additional examples, the one or more wearable sensors 146 may be configured to measure the biometric parameters 144 associated with the user 160 during use of the dry swim simulation system 102. For illustrative purposes only, the one or more wearable sensors 146 may include: a watch, a ring, or a bracelet, among others not explicitly listed herein. It should be appreciated that, in some examples, non-wearable sensors may be used in place of the one or more wearable sensors 146. The biometric parameters 144 may include a heartrate of the user 160, a breath count of the user 160, a quantity of calories burned by the user 160, and/or a blood pressure of the user 160, among other parameters not explicitly listed herein.

As an illustrative example, the analysis engine 138 of the computing device 134 may be configured to receive the parameters 140 associated with the user 160 during use of the dry swim simulation system 102 from the one or more electronic or mechanical components of the dry swim simulation system 102, such as the servo motor 150 and/or the one or more wearable sensors 146. For example, the analysis engine 138 of the computing device 134 may be configured to receive the performance parameters 142 associated with the user 160 during use of the dry swim simulation system 102 from the servo motor 150 and the biometric parameters 144 associated with the user 160 during use of the dry swim simulation system 102 from the one or more wearable sensors 146.

Once the analysis engine 138 of the computing device 134 receives the biometric parameters 144 and/or the performance parameters 142, the analysis engine 138 is configured to query the database 156 to identify a pre-determined execution level associated with each of the parameters 216 (of FIG. 3). The pre-determined execution level associated with each of the parameters 216 may be proper performance of a given parameter of the biometric parameters 144 or the performance parameters 142. For example, the pre-determined execution level associated with the performance parameter 142 of the stroke rate of the user 160 for a freestyle stroke for a distance over 400 meters may be 75. As another example, the pre-determined execution level associated with the biometric parameter 144 of the breath count of the user 160 may be one breath for every fourth stroke to the same side.

The analysis engine 138 may then compare each of the performance parameters 142 and each of the biometric parameters 144 to the pre-determined execution level associated with each of the parameters 216. If the analysis engine 138 determines that a given parameter matches or exceeds the pre-determined execution level, the analysis engine 138 will identify the proper execution of the given parameter. If the analysis engine 138 determines that the given parameter fails to exceed the pre-determined execution level, the analysis engine 138 will identify an improper execution of the given parameter. As an illustrative example, such proper or improper execution may be calculated as a percentage (e.g., the given parameter matches the pre-determined execution level 70% or the given parameter matches the pre-determined execution level 15%). In other examples, such proper or improper execution may be identified as "YES" (e.g., the given parameter matches or exceeds the associated pre-determined execution level) or "NO" (e.g., the given parameter fails to match or exceed the associated pre-determined execution level). The proper or improper execution of the given parameter may be displayed in numerous ways and the examples provided herein are for illustrative purposes only.

The analysis engine 138 may then display feedback 162 to the user 160 via the computing device 134. The feedback 162 may include each of the parameters, a result of the comparison, and/or an identification if the given parameter matches, exceeds, or fails to exceed the pre-determined execution level (e.g., the percentage calculation or the "YES" or "NO" identification), etc. The analysis engine 138 may then transmit, in real-time, the captured parameters and the result of the comparison to the database 156 for storage. It should be appreciated that the database 156 may store past performance data 212 associated with the user 160, as well as past performance data 214 associated with other users, as depicted in FIG. 3.

The analysis engine 138 may also transmit the captured parameters and the result of the comparison to the other user 158 associated with another computing device 164 (of FIG. 3). The other user 158 may be a physician, a personal trainer, a swimming coach, a swimming instructor, etc. The analysis engine 138 may then receive additional feedback data from the other user 158 and may display the additional feedback data as the feedback 162 to the user 160, in real-time, during use of the dry swim simulation system 102 for training purposes. The feedback 162 may be visual feedback, audio feedback, and/or textual feedback.

Additionally, the analysis engine 138 of the computing device 134 may be configured to receive images (not shown) associated with the user 160 during use of the dry swim simulation system from the camera 148 (of FIG. 3). As explained supra, the images may capture one or more body parts of the user 160. For example, the images may capture a linear position of the user 160, a linear position of an arm of the user 160, a linear position of a hand position of the user 160, etc. when engaging in a given swim stroke. In other examples, the images may capture a rotation of the user 160, a rotation of an arm of the user 160, a rotation of a hand position of the user 160, etc. when engaging in a given swim stroke.

The analysis engine 138 may then query the database 156 and compare each of the images captured from the camera 148 to images associated with proper performance of a given swim stroke 304 (of FIG. 3). In some examples, the analysis engine 138 may overlap the captured images with the images associated with the proper performance of the given swim stroke 304 and may transmit this comparison to the computing device 134 for display to the user 160. In other examples, the analysis engine 138 may transmit the captured images side by side with the images associated with the proper performance of the given swim stroke 304 to the computing device 134 for display to the user 160. Such comparison of the captured images and the images associated with the proper performance of the given swim stroke 304 provides the user 160 with visual recognition of the ways in which the user 160 can modify aspects of the users performance to more closely match proper performance of the given swim stroke.

In other examples, such video captured by the camera 148 may be analyzed by the analysis engine 138, with feedback 162 being transmitted to the computing device 134 for the user 160 to view.

In additional examples, the analysis engine 138 may query the database 156 to identify the past performance data 212 associated with the user 160 and/or the past performance data 214 associated with the other users (of FIG. 3). The analysis engine 138 may then compare the current parameters 140 associated with the user 160 engaging with the dry swim simulation system 102 to past performance data 212 associated with the user 160 and/or the past performance data 214 associated with the other users to improve the swimming performance and quality of swimming strokes for the user 160. The analysis engine 138 may display this comparison data to the user 160 as the feedback 162 via the computing device 134.

In some embodiments, the dry swim simulation system 102 is foldable. In examples, the dry swim simulation system 102 may be foldable based on use of a vertical adjusting device (not shown). Such vertical adjusting device (not shown) also allows the user 160 to engage with the dry swim simulation system 102 vertically. In other examples, the vertical adjusting device (not shown) may be used to fold the dry swim simulation system 102 for storage. Additionally, the dry swim simulation system 102 may include wheels 218 to transport or move the dry swim simulation system 102, as depicted in FIG. 11. It should be appreciated that a quantity of the wheels 218 is non-limiting. Such ability to fold, move, and transport the dry swim simulation system 102 allows the dry swim simulation system 102 to be used at numerous locations, such as a home of the user 160, a health club, poolside, etc.

Figure 10A:
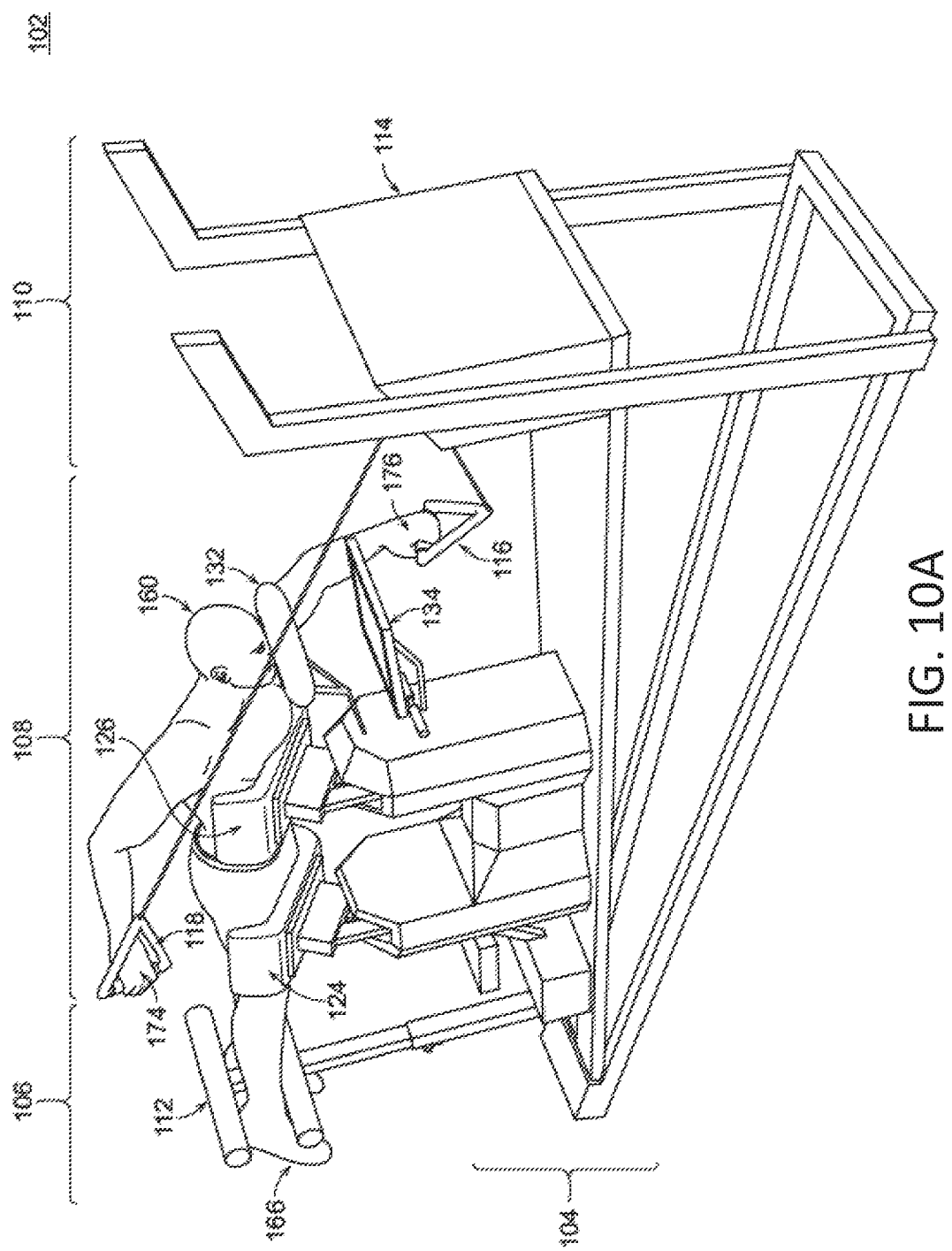
FIG. 10A depicts a perspective and schematic view of increasing an incline of a base platform of a dry swim simulation system to accommodate an up-hill swim for a user, in accordance with embodiments of the present invention.
Figure 10B:
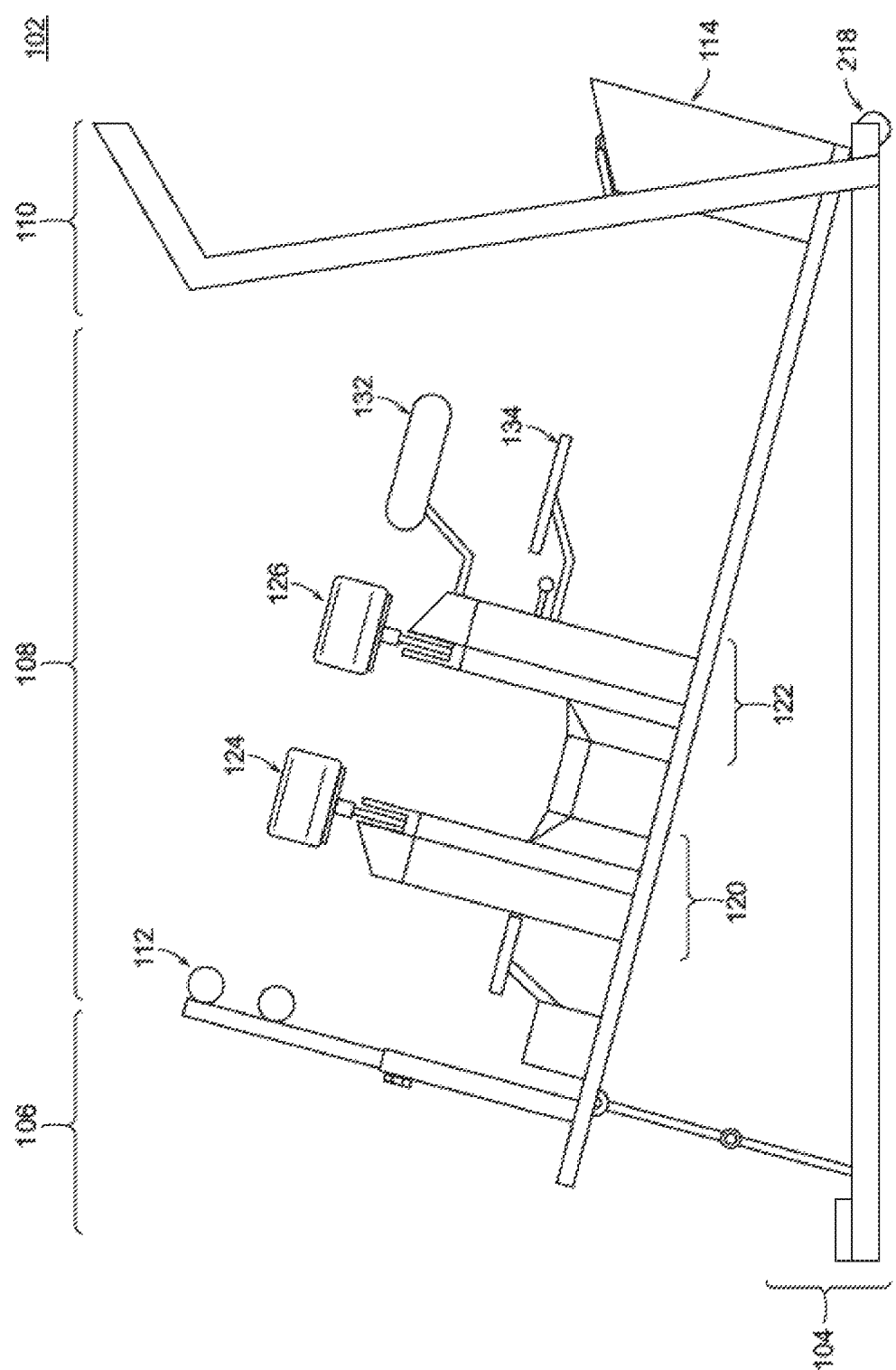
FIG. 10B depicts a perspective and schematic view of increasing an incline of a base platform of a dry swim simulation system to accommodate a down-hill swim for a user, in accordance with embodiments of the present invention.

In additional examples, the base platform 104 may comprise a mechanical device (not shown) and/or an electrical device (not shown) that raises or lowers the first portion 106 and/or the second portion 110 of the dry swim simulation system 102 to accommodate an uphill swim or a downhill swim for the user 160. FIG. 10A illustratively depicts use of the mechanical device (not shown) and/or the electrical device (not shown) to raise the second portion 110 of the dry swim simulation system 102 to accommodate the uphill swim for the user 160. FIG. 10B illustratively depicts use of the mechanical device (not shown) and/or the electrical device (not shown) to raise the first portion 106 of the dry swim simulation system 102 to accommodate the downhill swim for the user 160.

Figure 12:
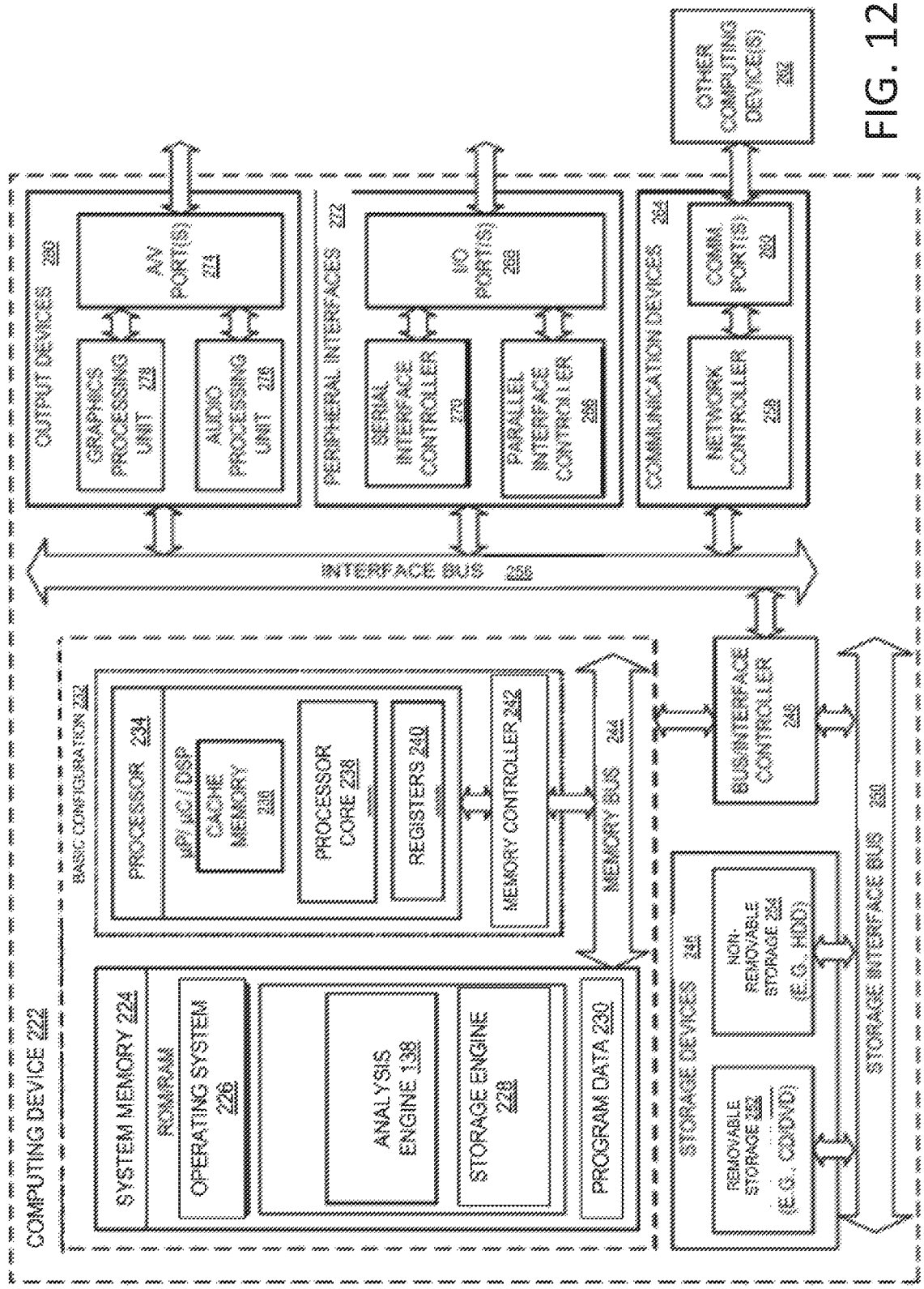
FIG. 12 depicts a block diagram of a computing device included within the dry swim simulation system of FIG. 3, in accordance with embodiments of the present invention.

Moreover, in further embodiments, the present invention may be a computer system, a method, and/or the computing device 134 (of FIG. 3) or the computing device 222 (of FIG. 12). For example, the computer system and/or the computing device 222 may be utilized with the dry swim simulation system 102.

A basic configuration 232 of a computing device 222 is illustrated in FIG. 12 by those components within the inner dashed line. In the basic configuration 232 of the computing device 222, the computing device 222 includes a processor 234 and a system memory 224. In some examples, the computing device 222 may include one or more processors and the system memory 224. A memory bus 244 is used for communicating between the one or more processors 234 and the system memory 224.

Depending on the desired configuration, and as depicted in FIG. 12, the processor 234 may be of any type, including, but not limited to, a microprocessor (µP), a microcontroller (µC), and a digital signal processor (DSP), or any combination thereof. Further, the processor 234 may include one more levels of caching, such as a level cache memory 236, a processor core 238, and registers 240, among other examples. The processor core 238 may include an arithmetic logic unit (ALU), a floating point unit (FPU), and/or a digital signal processing core (DSP Core), or any combination thereof. A memory controller 242 may be used with the processor 234, or, in some implementations, the memory controller 242 may be an internal part of the memory controller 242.

Depending on the desired configuration, and as depicted in FIG. 12, the system memory 224 may be of any type, including, but not limited to, volatile memory (such as RAM), and/or non-volatile memory (such as ROM, flash memory, etc.), or any combination thereof. The system memory 224 includes an operating system 226, one or more engines, such as the analysis engine 138, and program data 230. In some embodiments, the analysis engine 138 may be an application, a software program, a service, or a software platform, as described infra. The system memory 224 may also include a storage engine 228 that may store any captured parameters disclosed herein, such as the biometric parameters 144 and/or the performance parameters 142.

Moreover, the computing device 222 of FIG. 12 may have additional features or functionality, and additional interfaces to facilitate communications between the basic configuration 232 and any desired devices and interfaces. For example, a bus/interface controller 248 is used to facilitate communications between the basic configuration 232 and data storage devices 246 via a storage interface bus 250. The data storage devices 246 may be one or more removable storage devices 252, one or more non-removable storage devices 254, or a combination thereof. Examples of the one or more removable storage devices 252 and the one or more non-removable storage devices 254 include magnetic disk devices (such as flexible disk drives and hard-disk drives (HDD)), optical disk drives (such as compact disk (CD) drives or digital versatile disk (DVD) drives), solid state drives (SSD), and tape drives, among others.

In some embodiments, an interface bus 256 facilitates communication from various interface devices (e.g., one or more output devices 280, one or more peripheral interfaces 272, and one or more communication devices 264) to the basic configuration 232 via the bus/interface controller 256. Some of the one or more output devices 280 include a graphics processing unit 278 and an audio processing unit 276, which are configured to communicate to various external devices, such as a display or speakers, via one or more A/V ports 274.

The one or more peripheral interfaces 272 may include a serial interface controller 270 or a parallel interface controller 266, which are configured to communicate with external devices, such as input devices (e.g., a keyboard, a mouse, a pen, a voice input device, or a touch input device, etc.) or other peripheral devices (e.g., a printer or a scanner, etc.) via one or more I/O ports 268.

Further, the one or more communication devices 264 may include a network controller 258, which is arranged to facilitate communication with one or more other computing devices 262 over a network communication link via one or more communication ports 260. The one or more other computing devices 262 include servers, the database, mobile devices, and comparable devices.

The network communication link is an example of a communication media. The communication media are typically embodied by the computer-readable instructions, data structures, program modules, or other data in a modulated data signal, such as a carrier wave or other transport mechanism, and include any information delivery media. A "modulated data signal" is a signal that has one or more of its characteristics set or changed in such a manner as to encode information in the signal. By way of example, and not limitation, the communication media may include wired media (such as a wired network or direct-wired connection) and wireless media (such as acoustic, radio frequency (RF), microwave, infrared (IR), and other wireless media). The term "computer-readable media," as used herein, includes both storage media and communication media.

It should be appreciated that the system memory 224, the one or more removable storage devices 252, and the one or more non-removable storage devices 254 are examples of the computer-readable storage media. The computer-readable storage media is a tangible device that can retain and store instructions (e.g., program code) for use by an instruction execution device (e.g., the computing device 222). Any such, computer storage media is part of the computing device 222.

The computer readable storage media/medium can be a tangible device that can retain and store instructions for use by an instruction execution device. The computer readable storage media/medium may be, for example, but is not limited to, an electronic storage device, a magnetic storage device, an optical storage device, an electromagnetic storage device, and/or a semiconductor storage device, or any suitable combination of the foregoing. A non-exhaustive list of more specific examples of the computer readable storage media/medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and/or a mechanically encoded device (such as punch-cards or raised structures in a groove having instructions recorded thereon), and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of the present invention are described herein regarding illustrations and/or block diagrams of methods, computer systems, and computing devices according to embodiments of the invention. It will be understood that each block in the block diagrams, and combinations of the blocks, can be implemented by the computer-readable instructions (e.g., the program code).

The computer-readable instructions are provided to the processor 234 of a general purpose computer, special purpose computer, or other programmable data processing apparatus (e.g., the computing device 222) to produce a machine, such that the instructions, which execute via the processor 234 of the computer or other programmable data processing apparatus, create means for implementing the functions/acts specified in the block diagram blocks. These computer-readable instructions are also stored in a computer-readable storage medium that can direct a computer, a programmable data processing apparatus, and/or other devices to function in a particular manner, such that the computer-readable storage medium having instructions stored therein comprises an article of manufacture including instructions, which implement aspects of the functions/acts specified in the block diagram blocks.

The computer-readable instructions (e.g., the program code) are also loaded onto a computer (e.g. the computing device 222), another programmable data processing apparatus, or another device to cause a series of operational steps to be performed on the computer, the other programmable apparatus, or the other device to produce a computer implemented process, such that the instructions, which execute on the computer, the other programmable apparatus, or the other device, implement the functions/acts specified in the block diagram blocks.

Computer readable program instructions described herein can also be downloaded to respective computing/processing devices from a computer readable storage medium or to an external computer or external storage device via a network (e.g., the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer/computing device, partly on the user's computer/computing device, as a stand-alone software package, partly on the user's computer/computing device and partly on a remote computer/computing device or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to block diagrams of methods, computer systems, and computing devices according to embodiments of the invention. It will be understood that each block and combinations of blocks in the diagrams, can be implemented by the computer readable program instructions.

The block diagrams in the Figures illustrate the architecture, functionality, and operation of possible implementations of computer systems, methods, and computing devices according to various embodiments of the present invention. In this regard, each block in the block diagrams may represent a module, a segment, or a portion of executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block and combinations of blocks can be implemented by special purpose hardware-based systems that perform the specified functions or acts or carry out combinations of special purpose hardware and computer instructions.

Another embodiment of the invention provides a method that performs the process steps on a subscription, advertising, and/or fee basis. That is, a service provider can offer to assist in various method steps while using the dry swim simulation system 102. In this case, the service provider can create, maintain, and/or support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A dry swim simulation system comprising:
a base platform having a middle portion disposed between a first portion and a second portion;
the first portion of the base platform comprising a foot rest located parallel to the base platform and configured to receive feet of a user or a kicking component comprising a kicking mechanism;
the second portion of the base platform comprising:
a platform extending vertically from the base platform;
a first retractable pulley comprising a first grip affixed to a first retractable cable, the first grip being configured to be gripped by a left hand of the user and the first retractable cable being stored within the platform; and
a second retractable pulley comprising a second grip affixed to a second retractable cable, the second grip being configured to be gripped by a right hand of the user and the second retractable cable being stored within the platform; and
the middle portion comprising:
a first support assembly comprising a first side disposed opposite a second side, the first side of the first support assembly being affixed to the base platform proximate the first portion of the base platform and the second side of the first support assembly comprising a first movable cradle configured to receive thighs of the user; and
a second support assembly comprising a first side disposed opposite a second side, the first side of the second support assembly being affixed to the base platform proximate the second portion of the base platform and the second side of the second support assembly comprising:
a second movable cradle configured to receive a torso of the user;
a computing device; and
a headrest comprising an opening configured to receive a face of the user such that the user is configured to view the computing device,
a computing device comprising at least an analysis engine,
wherein an analysis engine of the computing device is configured to:
receive the performance parameters from the servo motor, query a database to identify a pre-determined execution level associated with each of the performance parameters,
compare each of the performance parameters to the pre-determined execution level associated with each of the performance parameters to identify if each of the performance parameters meets, exceeds, or fails to exceed the pre-determined execution level associated with each of the performance parameters,
display each of the performance parameters and a result of the comparison to the user during use of the dry swim simulation system,
transmit the performance parameters and the result of the comparison to a database for storage and to another user associated with another computing device,
receive feedback data from the other user, and display the feedback data to the user during use of the dry swim simulation system.

2. The dry swim simulation system of claim 1, wherein the dry swim simulation system is foldable.

3. The dry swim simulation system of claim 1, wherein the base platform further comprises wheels to transport the dry swim simulation system.

4. The dry swim simulation system of claim 1, wherein the user is configured with one or more wearable sensors.

5. The dry swim simulation system of claim 4, wherein the one or more wearable sensors are configured to measure biometric parameters associated with the user during use of the dry swim simulation system.

6. The dry swim simulation system of claim 1, wherein each of the first movable cradle and the second movable cradle comprise a height mechanism configured to raise or lower a body of the user and/or a tilt mechanism configured to move the body of the user to a left side or a right side.

7. The dry swim simulation system of claim 1, wherein the headrest comprises a pivot mechanism allowing the user to pivot and/or rotate a head of the user during use of the dry swim simulation system.

8. The dry swim simulation system of claim 1, further comprising:
a camera configured to capture images associated with the user during use of the dry swim simulation system.

9. The dry swim simulation system of claim 1, further comprising:
a servo motor configured to measure performance parameters associated with the user during use of the dry swim simulation system.

10. A foldable and/or transportable dry swim simulation system comprising:
a base platform having a middle portion disposed between a first portion and a second portion;
the first portion of the base platform comprising a kicking component, the kicking component comprising a kicking mechanism;
the second portion of the base platform comprising:
a platform extending vertically from the base platform;
a first retractable pulley comprising a first grip affixed to a first retractable cable, the first grip being configured to be gripped by a left hand of the user and the first retractable cable being stored within the platform; and
a second retractable pulley comprising a second grip affixed to a second retractable cable, the second grip being configured to be gripped by a right hand of the user and the second retractable cable being stored within the platform;
the middle portion comprising:
a first support assembly comprising a first side disposed opposite a second side, the first side of the first support assembly being affixed to the base platform proximate the first portion of the base platform and the second side of the first support assembly comprising a first movable cradle configured to receive thighs of the user; and a second support assembly comprising a first side disposed opposite a second side, the first side of the second support assembly being affixed to the base platform proximate the second portion of the base platform and the second side of the second support assembly comprising:
  a second movable cradle configured to receive a torso of the user;
  a computing device comprising at least an analysis engine,
    wherein the analysis engine of the computing device is configured to:
    receive the performance parameters from the servo motor,
    query a database to identify a pre-determined execution level associated with each of the performance parameters,
    compare each of the performance parameters to the pre-determined execution level associated with each of the performance parameters to identify if each of the performance parameters meets, exceeds, or fails to exceed the pre-determined execution level associated with each of the performance parameters,
    display each of the performance parameters and a result of the comparison to the user during use of the dry swim simulation system,
    transmit the performance parameters and the result of the comparison to a database for storage and to another user associated with another computing device,
    receive feedback data from the other user, and
    display the feedback data to the user during use of the dry swim simulation system; and
  a headrest comprising an opening configured to receive a face of the user such that the user is configured to view the computing device; and
a servo motor configured to capture performance parameters associated with the user during use of the dry swim simulation system.

11. The foldable and/or transportable dry swim simulation system of claim 10,
  wherein the user is configured with one or more wearable sensors, and
  wherein the one or more wearable sensors are configured to measure biometric parameters associated with the user during use of the dry swim simulation system.

12. The foldable and/or transportable dry swim simulation system of claim 11, wherein the analysis engine of the computing device is configured to:
  receive the biometric parameters from the one or more wearable sensors;
  query a database to identify a pre-determined execution level associated with each of the biometric parameters;
  compare each of the biometric parameters to a pre-determined execution level associated with each of the biometric parameters to identify if each of the biometric parameters meets, exceeds, or fails to exceed the pre-determined execution level associated with each of the biometric parameters; and
  display each of the biometric parameters and a result of the comparison to the user during use of the dry swim simulation system.

13. The foldable and/or transportable dry swim simulation system of claim 12, wherein the analysis engine of the computing device is configured to:
  transmit the biometric parameters and the result of the comparison to a database for storage and to another user associated with another computing device;
  receive feedback data from the other user; and
  display the feedback data to the user during use of the dry swim simulation system.

14. The foldable and/or transportable dry swim simulation system of claim 10, further comprising:
  a camera configured to capture images associated with the user during use of the dry swim simulation system.

15. The foldable and/or transportable dry swim simulation system of claim 14, wherein the analysis engine of the computing device is configured to:
  receive the images from the camera;
  query a database and compare each of the captured images to images associated with proper performance of a given swim stroke; and
  display the comparison of the captured images and the images associated with proper performance of the given swim stroke to the user during use of the dry swim simulation system.

16. The foldable and/or transportable dry swim simulation system of claim 10, wherein the computing device further comprises a virtual reality engine, wherein the user is configured with virtual reality glasses or goggles such that the user engages in a virtual reality experience when the user views the computing device.

17. The foldable and/or transportable dry swim simulation system of claim 10, wherein the kicking component is an interchangeable flutter kicker piece, such that the kicking mechanism of the kicking component simulates an up and down flutter kick, while a body of the user is stabilized in a streamline position.

* * * * *